United States Patent
Genov et al.

(10) Patent No.: US 9,870,588 B1
(45) Date of Patent: Jan. 16, 2018

(54) METHODS SYSTEMS AND ARTICLES OF MANUFACTURE FOR ADAPTING A FINANCE PROGRAM TO A USER OF THE FINANCE PROGRAM

(75) Inventors: Alexander B. Genov, Santee, CA (US); Gang Wang, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 1433 days.

(21) Appl. No.: 12/571,141

(22) Filed: Sep. 30, 2009

(51) Int. Cl.
*G06Q 40/00* (2012.01)

(52) U.S. Cl.
CPC .................... *G06Q 40/00* (2013.01)

(58) Field of Classification Search
CPC .......................... G06Q 40/123; G06Q 20/207
USPC .......................................................... 705/19
See application file for complete search history.

(56) References Cited

U.S. PATENT DOCUMENTS

2008/0077503 A1*  3/2008  Zias et al. ........................ 705/19
2009/0012884 A1*  1/2009  Harman et al. .................. 705/31

* cited by examiner

*Primary Examiner* — Shay S Glass
*Assistant Examiner* — Russell S Glass
(74) *Attorney, Agent, or Firm* — Vista IP Law Group LLP

(57) ABSTRACT

Adapting a tax preparation program to a user of the tax preparation program. Data related to a user of the tax preparation program is received at a computer, and a processing element compares received data to profile criteria to select a profile, which may be a pre-defined profile or a dynamically generated profile. A first template corresponding to the selected profile is selected and includes a first collection of forms or screens selected from available forms or screens of the tax preparation program. The first template screens or forms are displayed to the user who prepares an electronic tax return using the first template. The manner in which the user interacts with or changes the first template may be used to generate a modified or second template, which may be used to prepare a current or future electronic tax return and may be provided to other users having similar profiles.

37 Claims, 21 Drawing Sheets

| 1 | Personal |
| 2 | W2 |
| 3 | Interest - Bank |
| 4 | Deduction - Student Loan Interest |
| 5 | Scholarship |

METHODS SYSTEMS AND ARTICLES OF MANUFACTURE FOR ADAPTING A FINANCE PROGRAM TO A USER OF THE FINANCE PROGRAM

BACKGROUND

The invention relates to finance applications or programs such as tax preparation and personal finance programs that may be utilized to prepare electronic tax returns and manage personal finances. Examples of tax preparation programs include TurboTax®, ProSeries® and Lacerte® tax preparation programs, which are known consumer and professional tax preparation programs available from Intuit Inc., Mountain View, Calif., H&R Block TaxCut software, available from H&R Block, Inc., Kansas City, Mo., and TaxACT® software, available from $2^{nd}$ Story Software, Inc. TurboTax®, ProSeries® and Lacerte® are registered trademarks of Intuit Inc., and TaxACT® is a registered trademark of $2^{nd}$ Story Software, Inc. Examples of desktop and on-line personal finance programs include Quicken®, FinanceWorks® and Mint.com, available from Mint Software, Inc., Microsoft Money, which is available from Microsoft Corporation, Redmond, Wash. and other personal finance programs including wasabe.com. Quicken® and FinanceWorks® are registered trademarks of Intuit Inc.

Personal finance programs such as tax preparation programs have become very popular and allow a user, such as a taxpayer or tax professional, to prepare and electronically file an electronic individual or business tax return using a computer. For example, certain tax preparation programs present a list of tax-related questions or data entry fields to the user as a series of interview screens or fillable forms. In response, the user enters appropriate data or answers. Requested data or questions may relate to personal and family matters such as the user's social security number, marital status, number of dependents, etc. Other interview screens and questions may relate the user's wages, retirement plan contributions, and state and federal taxes that were paid or withheld as provided in Form-W2. Upon entering the required data, the tax preparation program prepares an electronic tax return, and the electronic tax return is formatted as necessary and electronically filed with a tax authority such as the Internal Revenue Service, a state tax authority, or other tax collecting entity on behalf of the user.

While tax preparation programs have greatly simplified preparation of tax returns, such applications have a rigid framework of interview screens and forms. These screens or forms are organized according to a pre-defined structure and are arranged to be presented in a particular linear sequence. Further, the interface used by the tax preparation application is the same for all users. Moreover, user interaction with the interview screens or forms is fixed and is the same for all users due to the pre-determined or fixed tree structure and interface.

These pre-determined structures and sequences, while providing certain predictability and simplifying programming, lack flexibility and do not address unique attributes of different users or categories or groups of users of the tax preparation program. As such, tax preparation programs having fixed, pre-determined file structures, interface and interaction models are not personalized or customized to individual users. Instead, screens or forms are presented to users in the same manner without regard to whether the user would prefer to work with a different interface or interact differently with the tax preparation program. The static, pre-defined and rigid nature of known tax preparation programs becomes readily apparent when considering that users differ vastly in their needs, preferences, behaviors, habits, attitudes, demographics, stage of life, psychology, personality, etc.

Thus, while users may be satisfied with the result achieved utilizing the tax preparation program, they may desire a more personalized experience when preparing the electronic tax return. The rigidity of known tax preparation programs may also undermine user confidence since particular attributes of the user may require completion of certain forms or screens that are not readily identifiable given the complexity of tax laws and since all of the required forms may not be readily identifiable when using the tax program, particularly if the user is not that familiar with computers, the tax preparation program, tax laws and forms.

SUMMARY

One embodiment is directed to a method of adapting, personalizing or customizing a finance program such as a tax preparation program to a user of the tax preparation program. The method comprises receiving, at a computer, data related to a first user of the tax preparation program and comparing, utilizing a processing element or mapping engine executing on the computer, the received data and profile criteria. The method further comprises selecting a profile based at least in part upon comparing the data and the profile criteria and selecting a first template of a plurality of templates. The selected first template corresponds to the selected profile and comprises a first collection of forms or screens selected from available forms or screens of the tax preparation program. The method further comprises displaying forms or screens of the first template to the first user to allow the first user to prepare a first electronic tax return using the first template.

Another embodiment is directed to a method of adapting, personalizing or customizing a finance program such as a tax preparation program to a user of the tax preparation program and comprises receiving, at a computer, data related to a first user, mapping the received data to a first template of a plurality of templates, and displaying forms or screens of the first template to the first user to allow the first user to prepare a first electronic tax return using the first template. The first template comprises a first collection of forms or screens selected from available forms or screens of the tax preparation program.

A further embodiment is directed an article of manufacture comprising a computer program carrier that is readable by a computer and includes one or more instructions that are executable by the computer to perform method steps of programming a computer. In one embodiment, the method comprises steps for adapting, personalizing or customizing a finance program such as a tax preparation program to a user and comprises receiving, at a computer, data related to a first user of the tax preparation program and comparing, utilizing a processing element or mapping engine executing on the computer, the received data and profile criteria, selecting a profile based at least in part upon comparing the data and the profile criteria and selecting a first template of a plurality of templates. The selected first template corresponds to the selected profile and comprises a first collection of forms or screens selected from available forms or screens of the tax preparation program. The method further comprises displaying forms or screens of the first template to the first user to allow the first user to prepare a first electronic tax return using the first template.

Yet another embodiment is directed an article of manufacture comprising a computer program carrier that is readable by a computer and includes one or more instructions that are executable by the computer to perform method steps of programming a computer. In one embodiment, the method comprises steps for adapting, personalizing or customizing a finance program such as a tax preparation program to a user. The method comprises steps of receiving, at a computer, data related to a first user, mapping the received data to a first template of a plurality of templates, the first template comprising a first collection of forms or screens selected from available forms or screens of the tax preparation program, and displaying forms or screens of the first template to the first user to allow the first user to prepare a first electronic tax return using the first template.

In another embodiment, a system for adapting, personalizing or customizing a tax preparation program to a user comprises a computer comprising a processing element or mapping engine and a database or data store that stores data related to the user and received at the computer, profile criteria and a plurality of templates. The processing or mapping engine is operable or configured to compare data related to the user and received at the computer and profile criteria. A profile is selected based at least in part upon comparing the data and the profile criteria. A first template of a plurality of templates is selected and corresponds to the selected profile. The first template comprises a first collection of forms or screens selected from available forms or screens of the tax preparation program. The forms or screens of the first template may be displayed to the first user to allow the first user to prepare a first electronic tax return using the first template.

A further embodiment is directed to a system for adapting a tax preparation program to a user and comprises a computer comprising a processing element or mapping engine and database or data store that stores data received at the computer, profile criteria and a plurality of templates. Data related to a first user is received at the computer, and the processing element or mapping engine is operable or configured to map the received data to a first template of a plurality of templates. The first template comprises a first collection of forms or screens selected from available forms or screens of the tax preparation program. Forms or screens of the first template may be displayed to the first user to allow the first user to prepare a first electronic tax return using the first template.

In one or more embodiments, data that is received at the computer and compared to profile criteria, which may be in the form of pre-defined profiles or profile elements that are used to dynamically generate a profile, may be one or more or all of data of other users of the tax preparation program, which may be stored at or accessed by the computer, data of a prior electronic tax return of the first user, data provided by a tax authority or tax collecting entity, and data entered by the first user when using the tax preparation program or in response to a questionnaire. A questionnaire, for example, may request the user to answer questions or provide input related to the first user's personality, preferences, knowledge and attitudes. This data may be processed or analyzed by the processing element or mapping engine to determine which template would be best suited for the user.

For example, if the user has a good understanding of taxes and tax preparation programs, a template of forms or screens that are presented to the user may be more involved and more detailed since such users may want to go into lower level details of the electronic tax return, whereas users who do not have a good understanding may want a lower level of interaction and input and to have the electronic tax return do as much as possible for the user.

Data received at the computer and compared to profile criteria may also include demographic criteria such as age, income, education, marital status and number of children, etc. Data received at the computer and compared to profile criteria may also include behavioral data, which may be in the form of feedback regarding how the user interacted with the tax preparation program during prior use of the tax preparation program, e.g., during preparation of a prior electronic tax return or during prior use of the electronic tax return during preparation of a current tax return. Examples of behavior feedback data include how the first user navigated forms or screens of the tax preparation program, utilized a pre-determined key, utilized a pre-determined button or link displayed by the tax preparation program, an amount of time the first user spent on a form or screen, and a typing speed of the first user. For example, a user that repeatedly uses a help key or link and that has a slow typing or data input speed may not have a good understanding of taxes and tax preparation applications and may not be familiar or comfortable with computers. For these users, embodiments are able to adapt a template of forms or screens such that forms or screens that are presented to the user involve a lower level of interaction and input such that the tax preparation program does as much as possible with minimal input from the user, thereby reducing the amount of work that must be done by the user and increasing the user's confidence level. Thus, certain data that is used to select a template may or may not be included in an first electronic tax return since certain data is not the type of data that is normally included in an electronic tax return.

In one or more embodiments, profile criteria includes pre-defined or static profiles. A pre-defined profile comprises pre-defined criteria. Received data is compared with respective pre-defined criteria of respective pre-defined profiles, and a selected pre-defined profile including pre-defined criteria that exactly matches or that substantially corresponds to, or is the best match, with the received data is selected. A template is selected based on the selected pre-defined profile.

A pre-defined profile may include pre-defined demographic criteria such as pre-defined ranges of age, income, and a pre-defined marital status. For example, a first pre-defined profile may be for users of ages 18-25, another pre-defined profile may be for users of ages 26-35, and so on. Pre-defined profiles may also include pre-defined behavioral criteria data and pre-defined user preference or personality data. Behavior data may be related to how the first user navigates or interacts with forms or screens generated by the tax preparation program, and user preference data may be related to at least one of tax knowledge, prior experience with the tax preparation program, and a desired level of control of the first user while completing the first electronic tax return utilizing the tax preparation program. Embodiments may involve pre-defined profiles having one or more or all of demographic, behavior and user preference or behavior data.

Other embodiments involve dynamic generation of profiles rather than static or pre-defined profiles. In these embodiments, profile criteria comprises a plurality of profile elements or modules, received data is compared with the profile elements, and profile elements that match or substantially correspond to received data are selected. A profile is dynamically generated and includes selected profile elements. The first template is selected based at least in part upon the dynamically generated profile.

For example, profile elements or modules may include age 18-25, age 26-30, age 31-35, age 36-40, age 41-45. Upon receiving demographic data that a user is 37 years old, the profile element age 36-40 is selected for inclusion in the profile to be dynamically generated. Other profile elements related to other types of demographic criteria such as income, marital status, children, etc. may be selected in a similar manner. A dynamically generated profile may also include behavioral profile elements and user preference or personality elements. Examples of behavior profile elements include how the first user navigates or interacts with forms or screens generated by the tax preparation program such as how a user utilizes a pre-determined key on the keyboard, a pre-determined button or link displayed by the tax preparation program, how long the first user spends on a form or screen, and a typing speed of the first user. Examples of user preference or personality profile elements include tax knowledge, prior experience with the tax preparation program, and a desired level of control of the first user while completing the first electronic tax return utilizing the tax preparation program.

Embodiments may also utilize feedback related to how the first user interacts with or changes the first template during preparation of the first electronic tax return for a first year and modify the first template to generate a second template. Feedback may involve one or more of behavioral data and whether the user added forms to or deleted forms of the first template. The second template comprises a second collection of forms or screens selected from available forms or screens of the tax preparation program and is different than the first template. The second template may reflect changes such as a different form or screen, a different number of forms or screens, a different interface or a different sequence of forms or screens, and a different interaction with the forms or screens.

Forms or screens of the second template may be displayed to the first user during preparation of the first electronic tax return utilizing the tax preparation program for the first year and/or during preparation of a second electronic tax return utilizing the tax preparation program for the second year. The second template may also be provided to or displayed to a second or other user(s) of the tax preparation program. For example, the first template and/or the second template can be transmitted from a first computer to a second computer via a network, and other users of the tax preparation program can access the second computer and the templates thereon to prepare respective electronic tax returns. One implementation of embodiments may involve the second computer being part of a social network such that members of the social network can download at least one of the first template and the second template as a starting point for preparing their electronic tax returns.

In one or more embodiments, mapping received data to a first template involves comparing, utilizing a processing element executing on the computer, the received data and profile criteria, selecting a profile based at least in part upon comparing the data and the profile criteria and selecting the first template corresponding to the selected profile. Profile criteria may be or include pre-defined profiles, each of which includes pre-defined criteria, and profile elements that are selected to dynamically generate a profile, which is used to select a first template.

BRIEF DESCRIPTION OF THE DRAWINGS

The foregoing and other aspects of embodiments are described in further detail with reference to the accompanying drawings, wherein.

DETAILED DESCRIPTION OF ILLUSTRATED EMBODIMENTS

Figure 1:
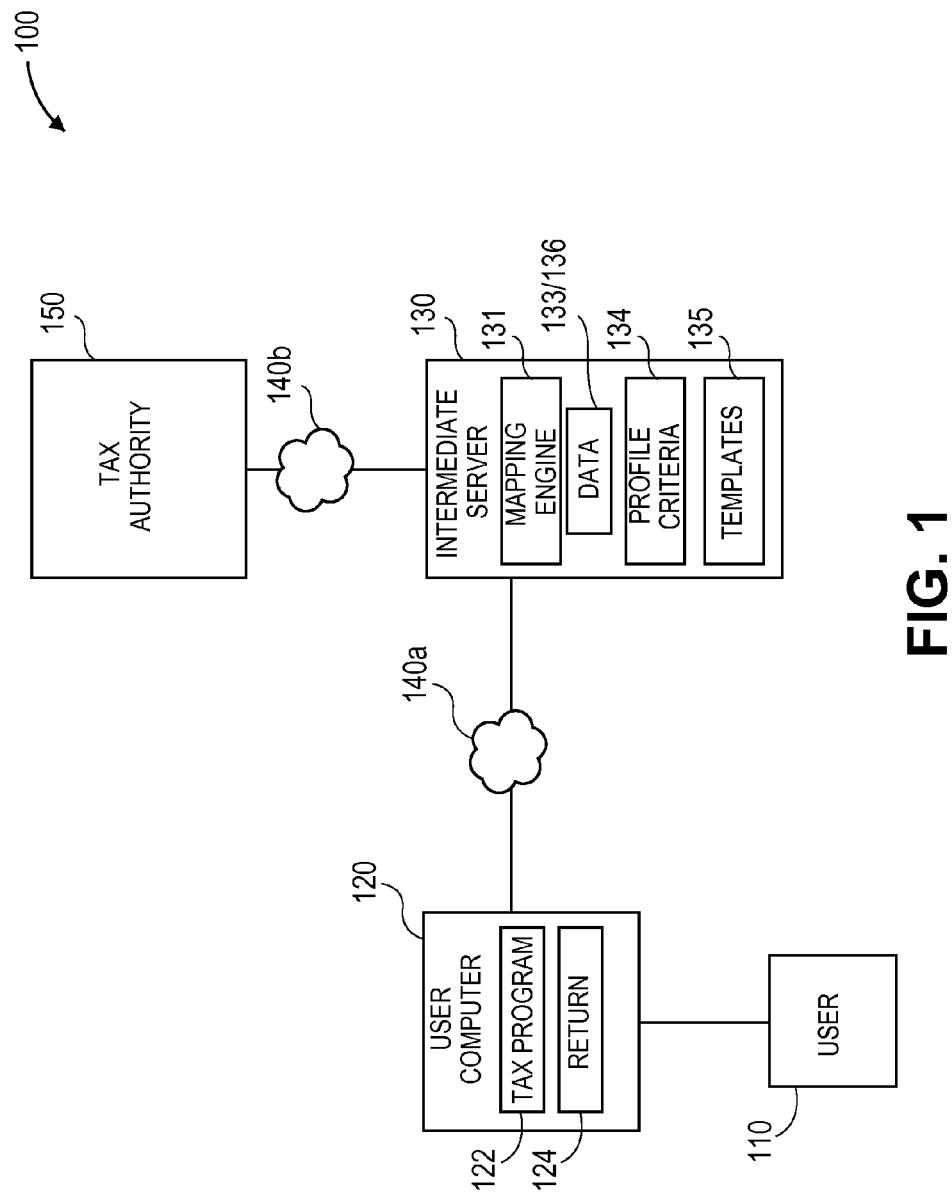
FIG. 1 illustrates one embodiment of a system configured or operable to adapt a tax preparation program or application to a user of the tax preparation program utilizing a mapping engine that selects a template based at least in part upon a comparison or analysis of data related to the user and profile criteria.

Embodiments relate to smart or intelligent finance applications or programs such as tax preparation programs. Embodiments directed to smart or intelligent tax preparation programs are able to personalize, customize or adapt features and functions of a tax preparation program to a user. A tax preparation program can be personalized or customized based on demographic data and life events of the user, as well as behavior and/or personality attributes of the user. In this manner, forms or screens of a tax preparation program or other finance program can be adapted or customized to users based on user demographics, needs, behaviors, habits, personality and/or preferences in order to provide the user with a personalized, more enjoyable and more engaging experience while preparing an electronic tax return.

Embodiments directed to smart or intelligent finance programs are also configured or operable to update or modify foil is or screens presented to a user and update or modify interfaces and interaction models based on data or feedback from a single or particular user and/or based on data or feedback received from various other users of the tax preparation program. In this regard, a tax preparation program according to embodiments learns from data or feedback acquired or received from various users, including various numbers (e.g., five, ten, fifty, hundreds and thousands) of users of the tax preparation program to modify or update templates accordingly.

In certain embodiments, content, interfaces and/or interaction models of the tax preparation program are personalized to users by comparing data related to the user with profile criteria and selecting a template that corresponds to, matches, or substantially matches, profile criteria. A template is a collection of forms or screens selected from available forms or screens of the tax preparation program, and the forms or screens and manner in which they are presented to the user and the manner in which the user interacts with the forms or screens provide for a personalized user experience while preparing an electronic tax return.

With embodiments, an initial template may be selected as an initial or best estimate regarding which forms and screens will be required by the user to prepare an electronic tax return based on profile criteria. With intelligent tax preparation programs of embodiments, the initial template can be modified or updated based on factors such as whether the user adds forms to or deletes forms from the initial template and how the user interacts with and navigates the template. The updated or second template can be used for the same or future electronic tax return and can be provided to other users who share common profile criteria to provide those other users with a template of forms or screens that can be used to prepare an electronic tax return. Further, templates based on data related to other users may be provided to a current user of the tax preparation program as a starting point for preparing an electronic tax return. Thus, other users having profile attributes that are similar to or that match profiles of a first user can be provided with an initial or updated profile of the first user. In an alternative embodiment, a template based on data related to these other users can be used to select a template for the first user to serve as a starting point of forms or screens that are to be completed to prepare the first user's electronic tax return. Template modifications and updates can be ongoing, e.g., periodic, such that the initial template provided to a user is modified based on current and new data. Various embodiments and aspects thereof are described in further detail with reference to FIGS. 1-20.

Figure 2:
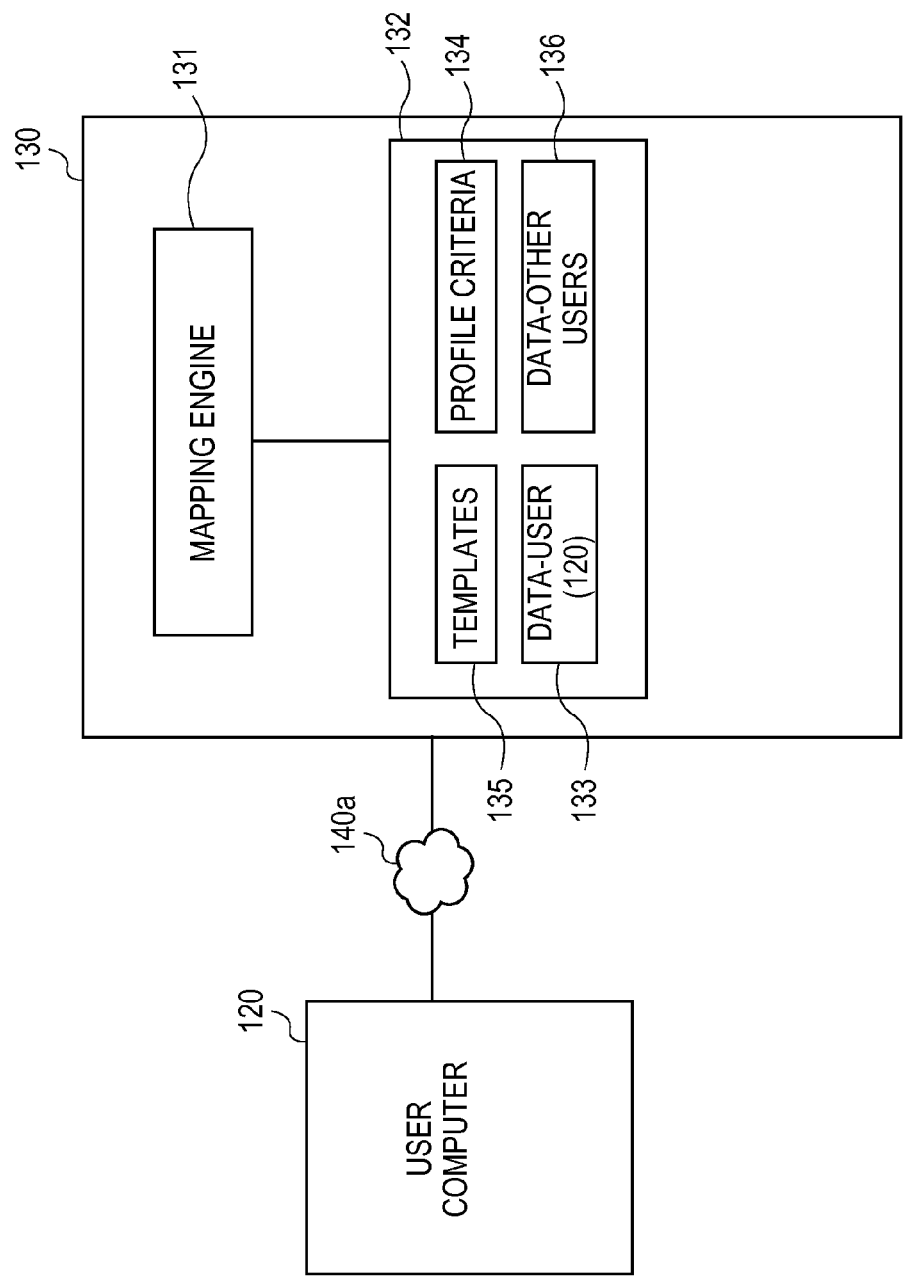
FIG. 2 illustrates one embodiment in which a mapping engine executes on an intermediate computer, and data and profile criteria are stored on or accessed by the intermediate computer.

Referring to FIGS. 1 and 2, a system 100 constructed according to one embodiment is configured or operable to adapt a finance application or program, such as a tax preparation application or program 122 (generally, "tax preparation program") for preparing an electronic tax return 124, to an individual, tax professional or other user 110 (generally, "user") of the tax preparation program 122. In this manner, embodiments provide the user 110 with a personalized experience when preparing the electronic tax return 124.

In the illustrated embodiment, the system 100 includes or involves a user computer 120 that is communication with an intermediate computer 130 via a network 140*a*. The user computer 120 may be, for example, a desktop, laptop, home, office or other computer. A processing element or mapping engine 131 (generally, "mapping engine"), which may be implemented as software, hardware or a combination thereof, executes on the intermediate computer 130 (as shown in FIGS. 1-2) or on another computer in communication with the intermediate computer 130. The intermediate computer 130 has or accesses one or more databases or data stores 132 (one data store 132 is shown in FIG. 1, generally, "data store"), for permanently or temporarily storing data 133 related to the user 110, profile criteria 134, and a plurality of templates 135. The data store 132 may also store data 136 of other users 110*a-n* (generally other users 110*n*) of the tax preparation program 122.

In the embodiment illustrated in FIG. 1, the tax preparation program 122 is a local or desktop version that executes on the user computer 120 to allow the user 110 to prepare the electronic tax return 124. The completed electronic tax return 124 is transmitted via network 140*a* to the intermediate server 130.

Figure 3:
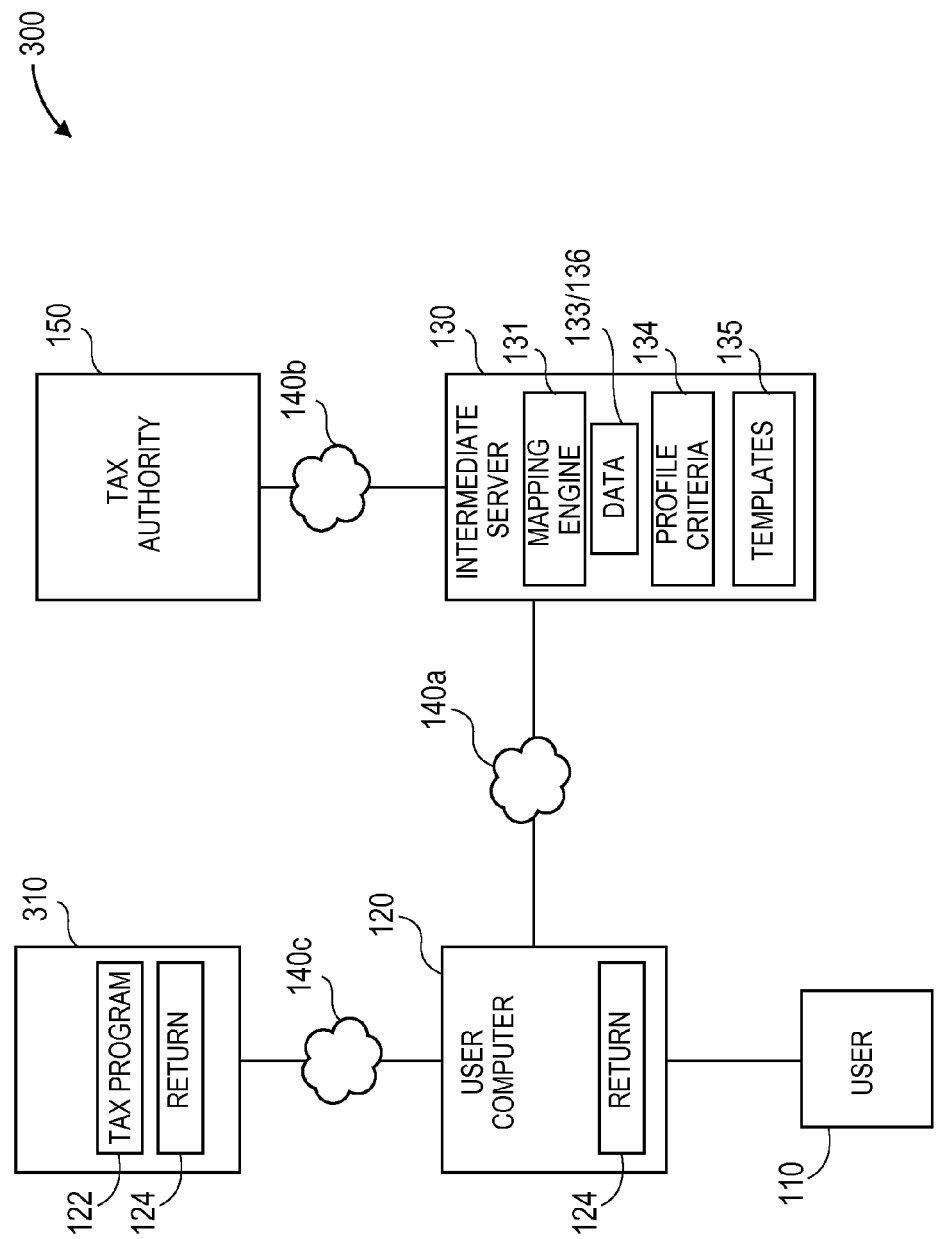
FIG. 3 illustrates a system constructed according to another embodiment involving an on-line tax preparation program that can be accessed by a user computer via a network.

Referring to FIG. 3, in a system 300 constructed according to another embodiment, the tax preparation program 122 is an on-line tax preparation program that resides on a server 310 that is accessible by the user computer 120 via a network 140*b*. For example, the computer 300 may host a website that includes the tax preparation program 122, and the user 110 may access the website and the tax preparation program 122 through the network 140*b* using a web browser that executes on the user computer 120. The tax preparation program 122 may also reside on the intermediate computer 130.

Examples of desktop and online tax preparation programs 122 that may be utilized or adapted for use with embodiments, or that may include embodiments, include, for example, TurboTax®, ProSeries® and Lacerte® tax preparation programs, which are known consumer and professional tax preparation programs available from Intuit Inc., Mountain View, Calif., H&R Block TaxCut software, available from H&R Block, Inc., Kansas City, Mo., and TaxACT® software available from $2^{nd}$ Story Software, Inc. TurboTax® ProSeries® and Lacerte® are registered trademarks of Intuit Inc., and TaxACT® is a registered trademark of $2^{nd}$ Story Software, Inc. For ease of explanation, reference is made generally to a tax preparation program 122, but it should be understood that embodiments may involve various desktop and on-line tax preparation programs 122 and networks 140.

Referring again to FIG. 1, the intermediate server 130 is also in communication with a server 150 of a tax authority (generally, "tax authority"). With the illustrated system 100 configuration, the intermediate server 130 may serve as, or be in communication with, an electronic filing system or server that functions as a "clearing house" for formatting and transmitting completed electronic tax returns 124 to the tax authority 150. The intermediate server 130 or clearing house may also process acknowledgements and other data received by the tax authority 150 and to route related information back to the user 110. For this purpose, as shown in FIG. 1, the intermediate server 130 is operably coupled to or in communication with the tax authority server 150 through a network 140c. One example of intermediate or electronic filing server 130 is a server of Intuit Inc., e.g., a server of the Intuit Electronic Filing Center. Other examples of electronic filing servers 130 include electronic filing servers utilized by TaxCut and TaxACT® tax return preparation applications.

Each of the networks 140a-c (and other networks discussed herein, generally, "network 140") may be different, or two or more networks 140 may be the same depending on the system configuration and communication protocols employed. One or more or all of the networks 140 may be, for example, a cellular network, a wireless network, a Local Area Network (LAN) and/or a Wide Area Network (WAN). Thus, reference to a network 140 generally is not intended to refer to a specific network or communications protocol, and it should be understood that embodiments can be implemented using various networks 140 and combinations thereof.

Figure 4:
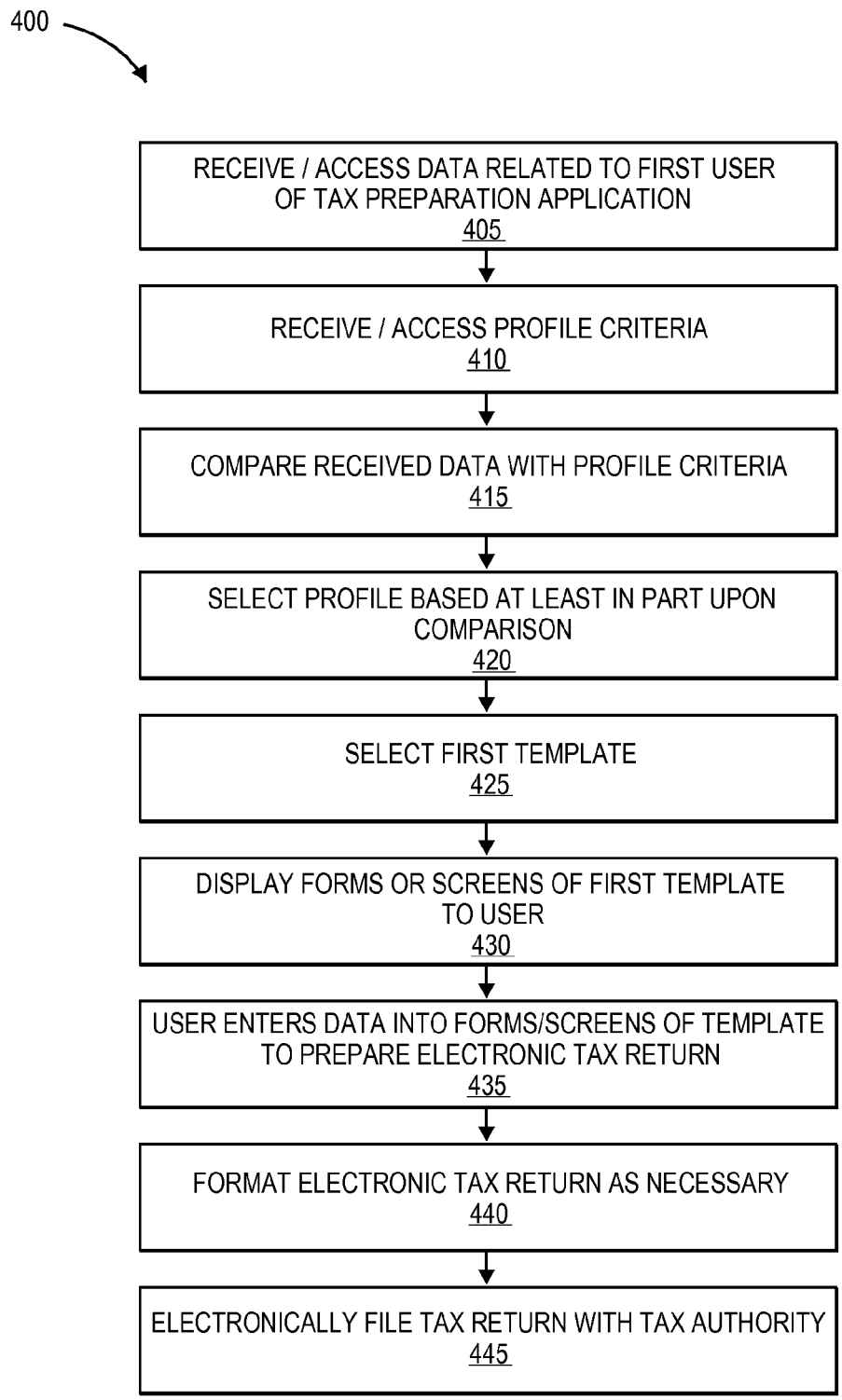
FIG. 4 is a flow diagram of one embodiment of a method for adapting a tax preparation program to a user of the tax preparation program utilizing a mapping engine that selects a template based at least in part upon a comparison or analysis of data related to the user and profile criteria.
Figure 5:
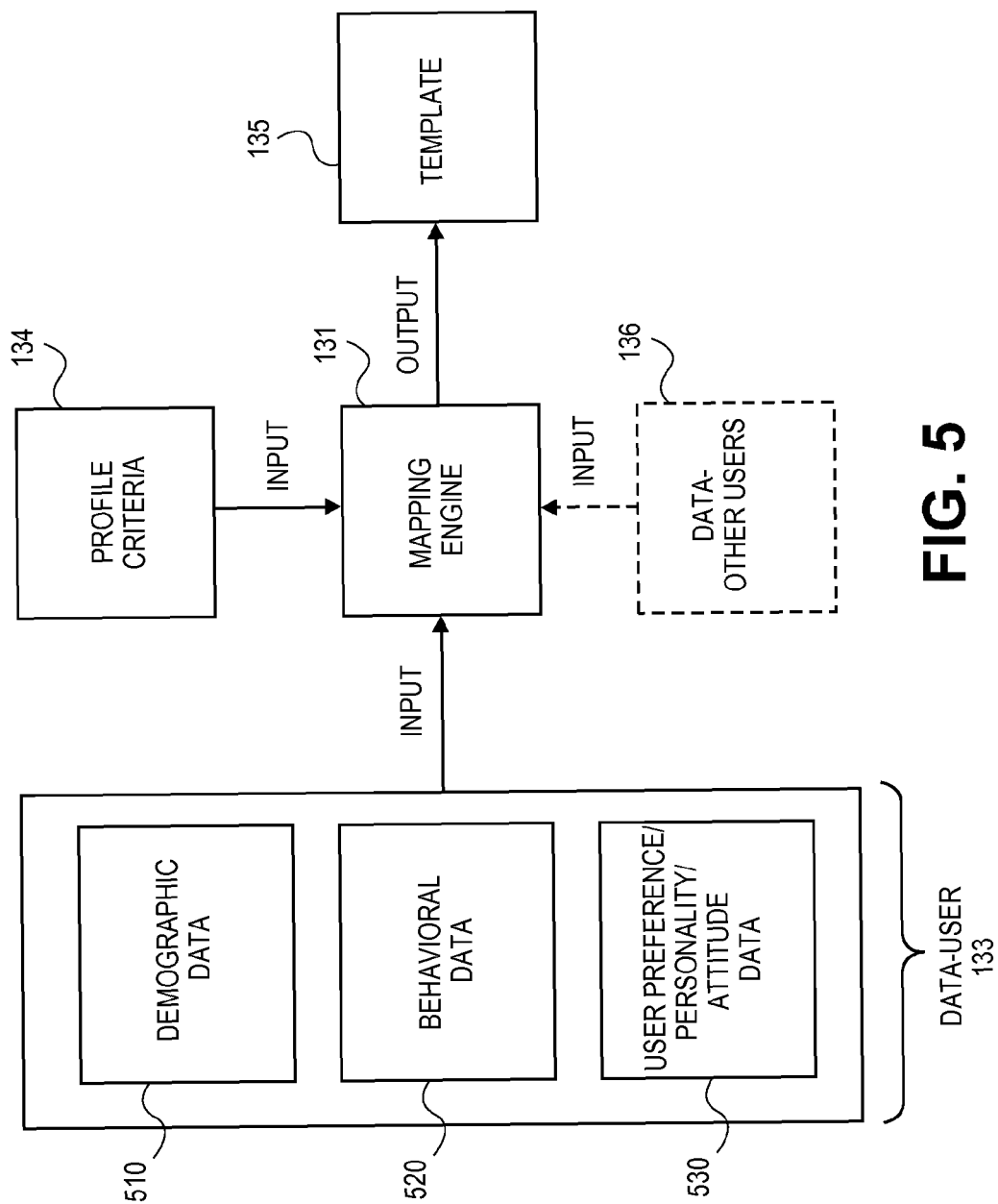
FIG. 5 illustrates a mapping engine comparing data and profile criteria inputs and generating an output that identifies a template of forms or screens to be utilized to prepare an electronic tax return.

Referring to FIG. 4, and with further reference to FIG. 5 a method 400, which may be implemented using systems shown in FIGS. 1-3 and other system configurations and components, for adapting a tax preparation program 122 to a user 110 includes, at stage 405, receiving, at the intermediate computer 130, data 133 related to the user 110. The mapping engine 131 may also receive data 136 (represented by dotted line) of other users 110n of the tax preparation application 122, but reference is made to data 133 generally for ease of explanation.

As shown in FIG. 5, the received data 133 is an input to the mapping engine 131. The mapping engine may receive or access the data 133. The mapping engine 131 receiving the data 133 is defined to include receiving the data 133 from a database, memory or data store 132 and accessing the data 133 stored in a database, memory or data store 132. Data 133 may be directly related to the user 110, e.g., data of the user 110. Data 133 may also be indirectly related to the user 110, e.g., data 136 of another user 110n of the tax preparation program 122 who may share certain attributes or profile criteria with the user 110.

Figure 6:
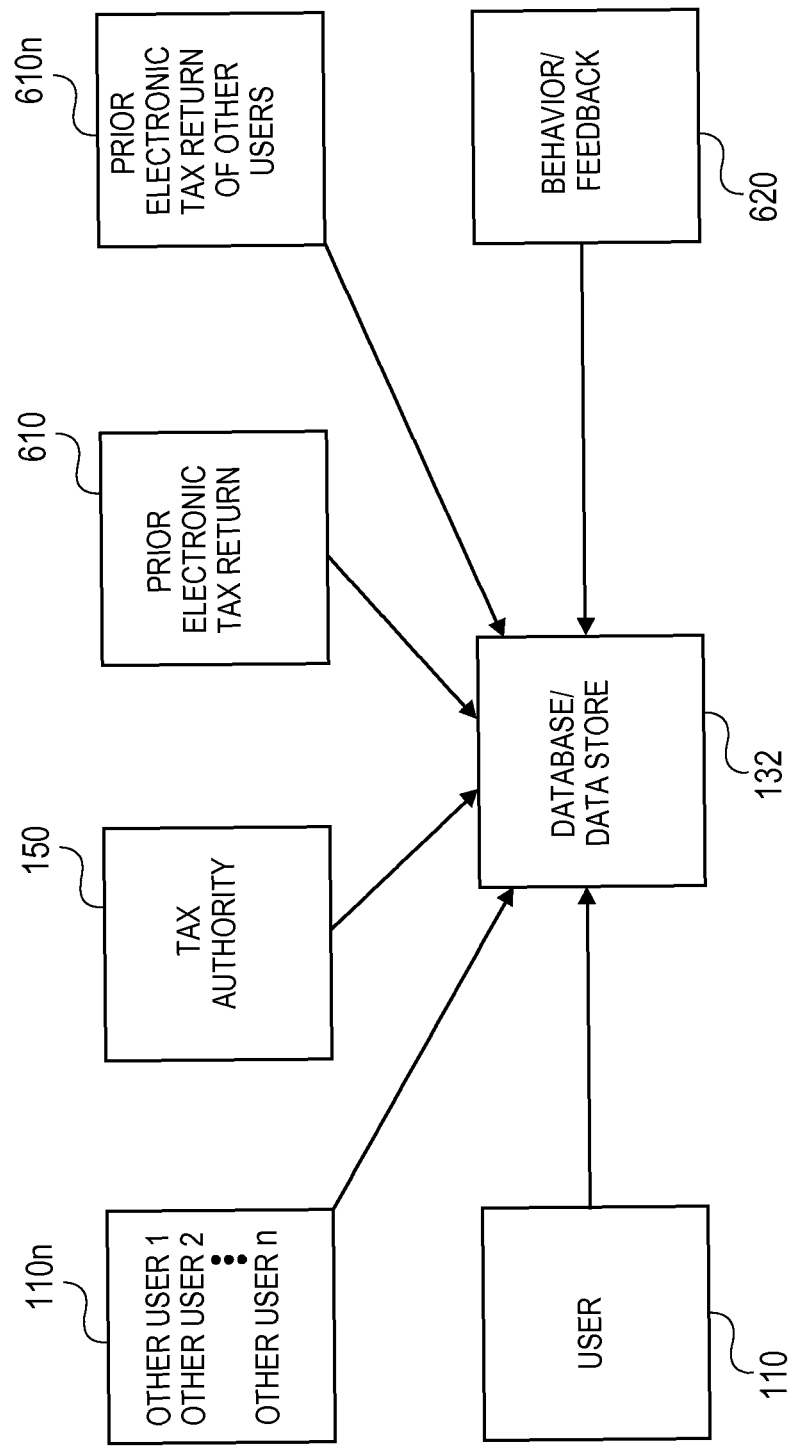
FIG. 6 generally illustrates different sources of data that may be compared with profile criteria according to embodiments.

Referring to FIG. 6, data 133 related to the user 110 and received at the intermediate computer 130 may be supplied by or retrieved from one or multiple sources. As shown in FIG. 6, possible sources of data 133 include one or more of the user 110, other users 120n of the tax preparation program 122, a prior electronic tax return 610 of the user 110, prior electronic tax returns 610n of other users 110n, feedback 620 relating to how the user 110 (or other users 110n) interacted with or navigated forms or screens of the tax preparation program 122, and a tax authority 150. For example, the user 110 may enter data 133 into an electronic tax return 124 or in response to a questionnaire that is generated by the tax preparation program 122. As another example, data from a prior electronic tax return 610, 610n may be stored by or imported into the intermediate computer 130.

Figure 7:
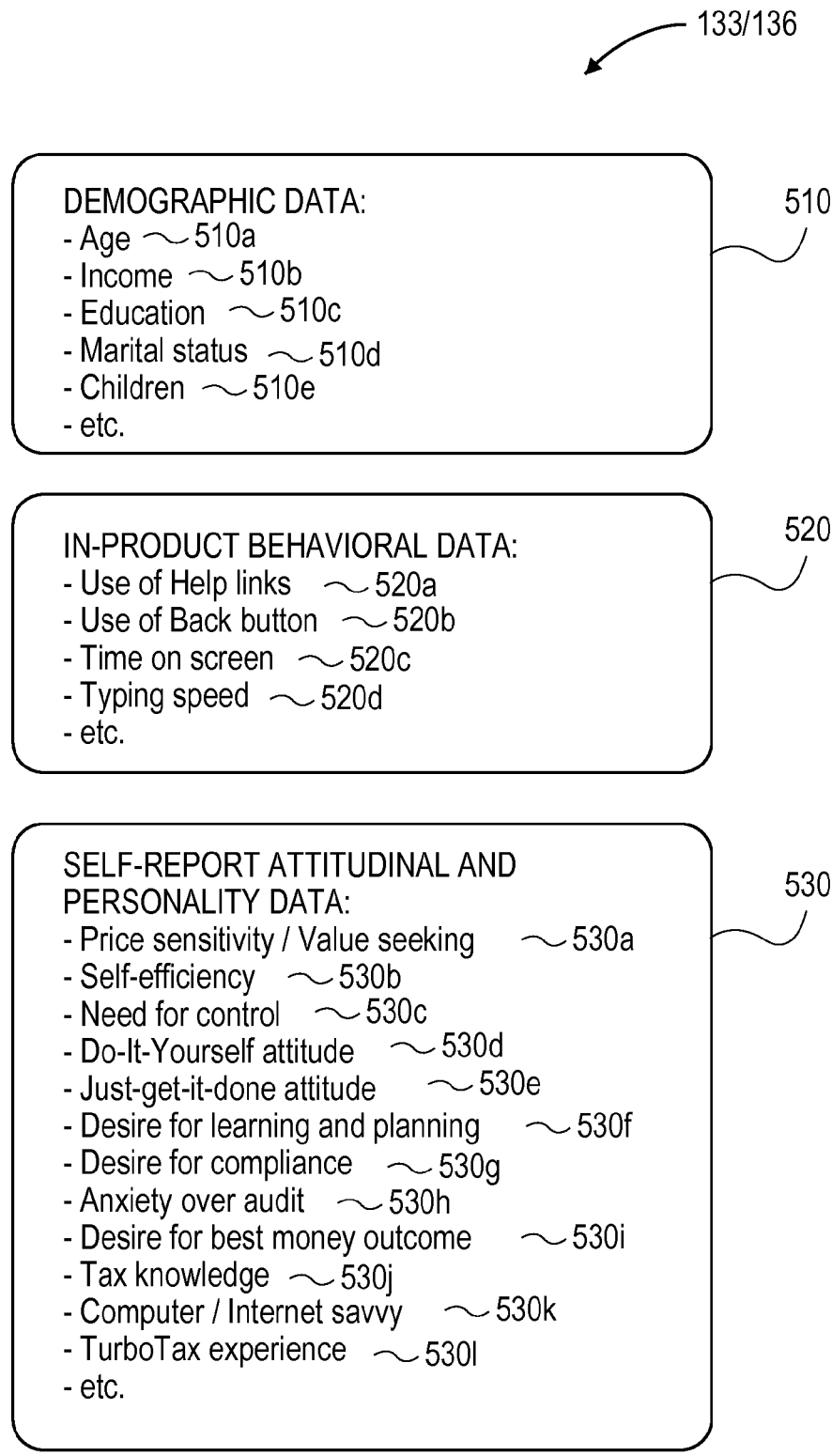
FIG. 7 illustrates examples of different types of demographic, behavioral and user preference data that may be utilized in embodiments.

Referring again to FIG. 5, according to one embodiment, data 133 received at the intermediate computer 130 may include one or more or all of demographic data 510, behavioral data 520 and user preference, personality or attitude data 530 (generally, "user preference data"). "Demographic" data 510 is defined as personal data of the user 110 and may also relate to people in the family of the user 110. Demographic data 510 may be unique to the user 110, or various other users 110n may share the same demographic data 510. Demographic data 510 may be imported from a prior year electronic tax return 610 of the user 110 or entered directly into a current electronic tax return 124. With further reference to FIG. 7, examples of demographic data 510 include, but are not limited to, age 510a, income 510b, education 510c, marital status 510d, children 510e, etc.

"Behavioral data" 520 is defined as data related to how the user 110 interacts with or responds to certain forms or screens of the tax preparation program 122. Behavioral data 510 may relate to the user 110 and/or other users 110n of the tax preparation program 122, but for ease of explanation, reference is made to behavioral data 520 of a user 110. Behavioral data 520 is subjective, and with further reference to FIG. 7, examples of behavioral data 520 include, but are not limited to, use of help links 520a within screens or forms of the tax preparation program 122, use of a back button 520b within screens or forms of the tax preparation program 122, the time the user 110 spends on a screen or form 520c, and a typing speed 520d of the user 110. Other examples of behavioral data 520 may include how quickly the user 110 completes certain forms, facial expressions of the user 110 (e.g., if a web cam is utilized with the user computer 110), whether the user 110 goes forwards and backwards or stops and starts often. Behavioral data 520 may be in the form of feedback that is provided to the mapping engine 131, e.g., from the tax preparation program engine that defines tax forms and the relationships among tax forms and describes or indicates how each screen should be laid out or presented on the display and how the screen or form should appear when printed. Feedback in the form of behavioral data 520 may also be received from other sources such as another finance program or a website.

"User preference data" 530 is defined as data relating to a preference, personality, attitude or emotion of the user 110. User preference data 530 may relate to the user 110 and/or other users 110n of the tax preparation program 122, but for ease of explanation, reference is made to user preference data 530 of the user 110. User preference data 530 may be obtained prior to utilizing the tax preparation program 122 and prior to preparation of the electronic tax return 124 by asking the user 110 various questions, e.g., in the form of a questionnaire. The answers to the questionnaire may indicate, for example, how deeply involved in the details of forms, numbers and related calculations the user 110 wants to be or feelings and impressions about certain manners of presenting forms and screens and related interaction with the tax preparation program 122. For example, the data may indicate whether the user 110 prefers a simplified interface that requires minimal thought and input or a more complicated interface that includes more data, more options and more links to underlying tax forms, etc. The data may also indicate whether a user wants less interaction, e.g., simply input numbers or data and proceed to the next screen, or a more involved and engaging interaction experience, in which the user 110 can learn about how certain tax determinations and calculations are performed, and how certain tax situations may affect a tax return.

Referring to FIG. 7, examples of user preference data 530 include, but are not limited to, price sensitivity or value 530a, self-efficacy 530b, the need for control 530c, whether the user 110 is inquisitive or has a "do-it-yourself" attitude 530d, whether the user 110 simply wants to finish the electronic tax return 530e or wants learn 530f about lower level details and what is involved in preparation of the electronic tax return 124 and various forms and screens, desire for compliance 530g with laws and regulations, the concern or anxiety of the user 110 over an audit 530h, the desire of the user 110 to maximize the a tax return 530i, tax knowledge 530j, computer or internet knowledge 530k, experience with or knowledge 530l of the tax preparation application 112 (such as TurboTax®). For example, the need for control, a "do-it-yourself" attitude and the desire to learn may indicate whether the user 110 would prefer a more detailed user interface and more involved interaction or engagement with the tax preparation program 122, whereas other behavior or personality traits may indicate that the user 110 has less confidence and would prefer to have more or all of the "work" performed by the tax preparation program 122. The interface presented to the user 110 and the level of interaction provided can be adjusted based on these user 110 characteristics.

Figure 8:
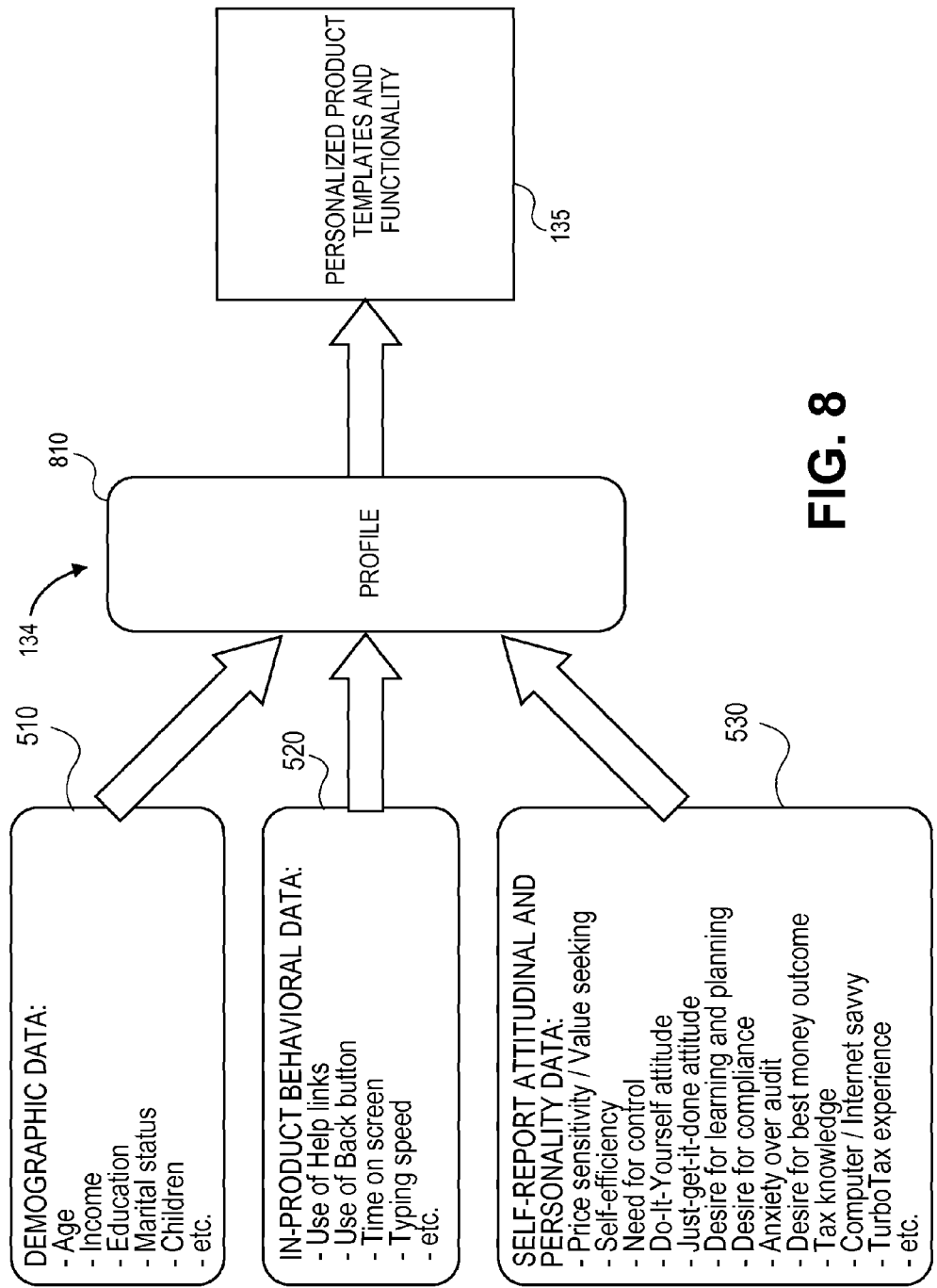
FIG. 8 is a flow chart illustrating one embodiment for selecting a template.

Referring again to FIG. 4, and with further reference to FIGS. 5 and 8, at stage 410, the mapping engine 131 receives or accesses the profile criteria or categories 134, and at stage 415, the mapping engine 131 compares or analyzes received data 133 and respective profile criteria 134. For example, with demographic data 510 related to "age," the profile criteria 134 for this type of demographic data 510 may be various ranges of ages, e.g., 18-24 years, 25-30 years, 31-35 years, etc. As another example, with demographic data 510 related to "marital status" the profile criteria 134 may be "single," "married," "divorced," "separated." As another example, with behavioral data 520 related to typing speed, the profile criteria 134 may be "slow, "medium" and "fast." With user preference data 530 related to "tax knowledge" the respective profile criteria 134 may be "none," "some," "moderate" and "advanced." Thus, stage 410 involves comparing the different types of data 133 and respective profile criteria 134.

Referring again to FIG. 4, and with further reference to FIG. 8, at stage 420, a profile 810 is selected based at least in part upon comparison of the received data 133 and profile criteria 134. A "profile" 810 is defined as a collection or group of profile elements, modules or criteria 134 that identifies the user 110 and/or represents attributes or characteristics of the user 110. A profile 810 may be selected if the received data 133 exactly matches or substantially matches profile criteria 134. In other embodiments, a profile 810 is selected if a certain number of profile criteria 134 is satisfied. In the event that multiple profiles 810 are selected, one profile 810 can be selected by the mapping engine 131, e.g., based on a ranking or priority system, or the user 110.

At stage 425, a template 135 is selected based at least in part upon the selected profile 810. A "template" 135 is defined as a collection of forms or screens to be generated by the tax preparation program 122 for display to the user 110. A template 135 that is selected based on the profile 810 takes into consideration demographic 510, behavioral 520 and/or user preference 530 data of the user 110. Thus, embodiments may involve use of one or more or all of demographic 510, behavioral 520 and user preference 530 data. In this manner, forms or screens selected from available forms or screens of the tax preparation program 122 (the content of the template 135 and what is displayed to the user 110), the manner in which the forms or screens are organized or laid out (the user interface) and/or the manner in the user 110 navigates the forms or screens (interaction) may are adapted, tailored or customized to the user 110.

At stage 430, the forms or screens of the template 135 are displayed to user 110, and at stage 435, the user 110 enters data into the forms or screens of the selected template 135 to prepare the electronic tax return 124. At stage 440, after the electronic tax return 124 has been completed, it is formatted as necessary by the intermediate computer 130, and at stage 445, the completed and formatted electronic tax return 124 is filed with the tax authority 150.

Figure 9:
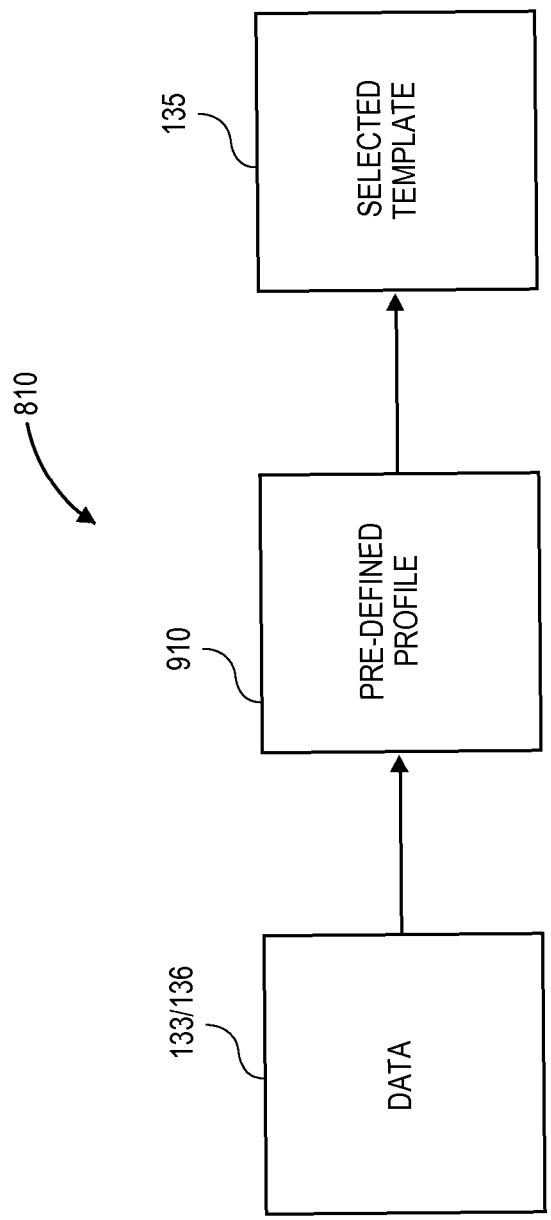
FIG. 9 is a flow chart illustrating one embodiment directed to selecting a template based at least in part upon a pre-defined profile.
Figure 10:
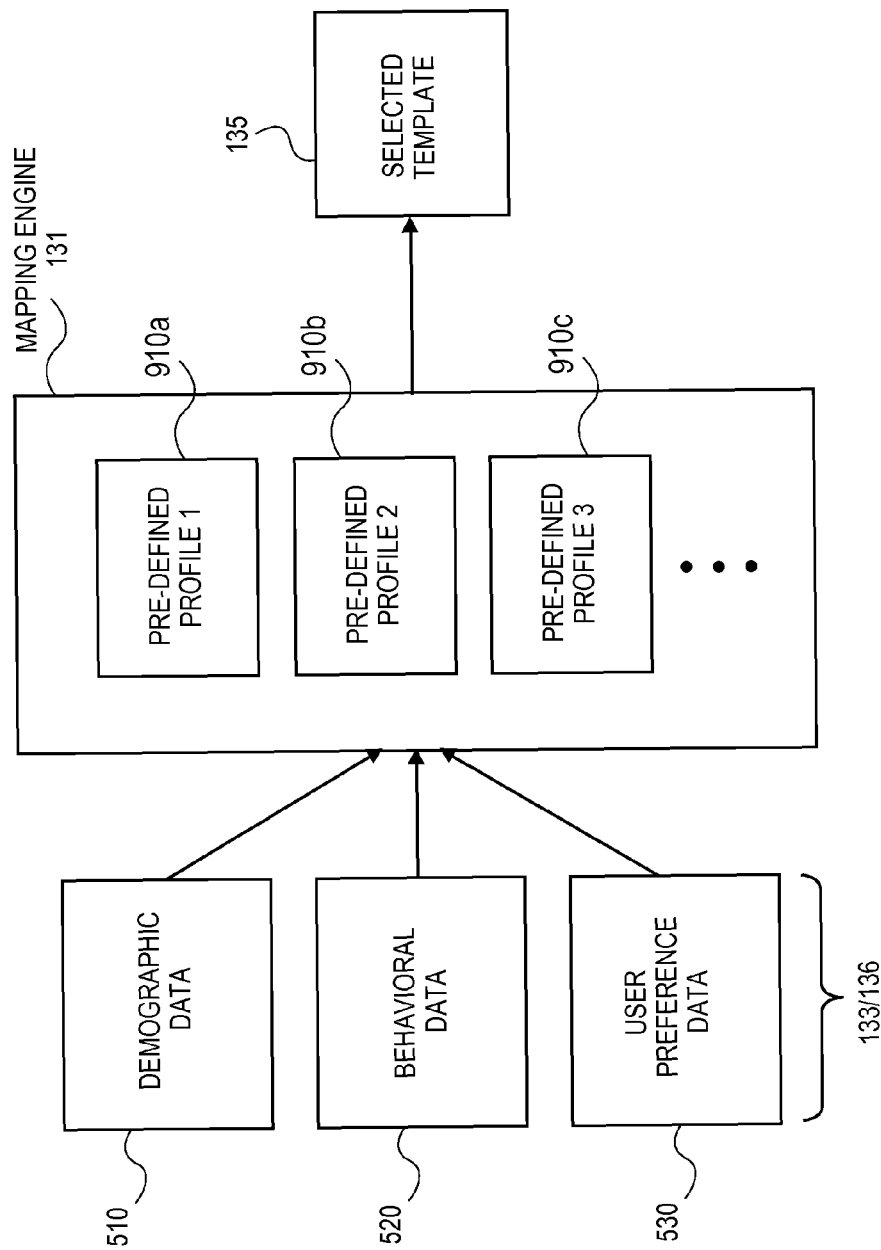
FIG. 10 is a flow chart illustrating one embodiment of a method of selecting a template based at least in part upon a pre-defined profile that is selected based at least in part upon comparing data related to the user and profile criteria or categories of pre-defined profiles.
Figure 11:
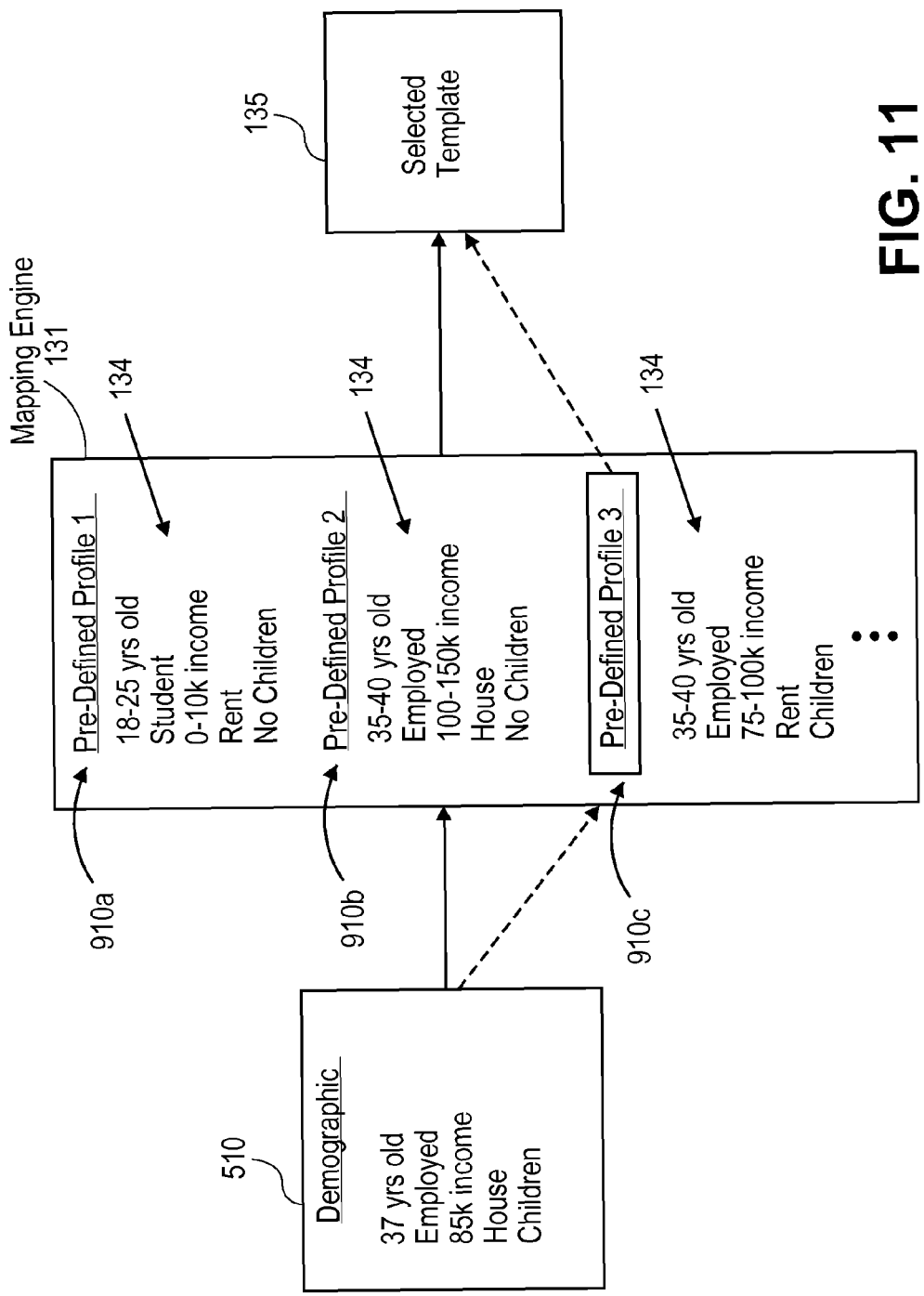
FIG. 11 illustrates one example of how the embodiment illustrated in FIG. 10 may be implemented.

Referring to FIGS. 9-11, according to one embodiment, the mapping engine 131 is configured or operable to receive or access data 133 related to the user 110 and compare the data 133 to plurality of static, pre-defined profiles 910 (pre-defined profiles 910a-c are illustrated in FIG. 10 for purposes of illustration) to determine which pre-defined profile 910 is the best match for the demographic 510, behavioral 520 and/or user preference 530 data. The selected pre-defined profile 910 is mapped to a template 135. As shown in FIG. 11, examples of pre-defined profiles 910 include profiles that have pre-determined criteria or categories 134. In the example shown in FIG. 11, received demographic data 510 of a user 110 that is 37 years old, has 75-100k income, owns a house, and has two children is compared to various pre-defined, static profiles 910a-c that include corresponding profile criteria 134.

In the illustrated embodiment, the mapping engine 131 would not select the first pre-defined profile 910a since none of the criteria or categories 134 of this profile 910a match the data 133. The third pre-defined profile 910c is a better match compared to the second pre-defined profile 910b since the third pre-defined profile 910c has more similarities, but it is not an exact match due to reciting renting rather than owning a house. Thus, in the illustrated embodiment, the mapping engine 131 would be operable or configured to select the third pre-defined profile 910c and to identify a corresponding template 135 that includes forms and screens for this profile 910a.

The mapping engine 131 associates or matches profile criteria 134 such as a pre-defined profile 910 to a template 135 in various ways. For example, in a case involving a "student tax template," the mapping engine 131 detects the following relevant criteria and parameters: age range=17-24; occupation=student; college attended=Anystate Community College; one or more W-2=YES; any other income=NO; housing situation=rent; interest in getting taxes out of the way=high; interested in learning ways to same on taxes=low, etc. Based on this criteria, the mapping engine 131 may select a template 135 for students at Anystate Community College (including this college's tax ID, etc.) with a set of pre-selected categories for income, deductions, credits, etc. that are most common for this tax situation.

It should be understood that while the example of how embodiments may be implemented involves certain types of demographic data 510, each of the pre-defined profiles 910 may include behavioral data 520 and/or user preference data 530. Further, it should be understood that a pre-defined profile 910 may involve some or all of demographic 510, behavioral 520 and user preference 530 data. Thus, FIG. 11 is provided as an illustrative example to show how the mapping engine 131 compares received data 133 and profile criteria 134, and how a pre-defined profile 910 is mapped to a template 135 of forms or screens that are suited for the user 110 so described.

Figure 12:
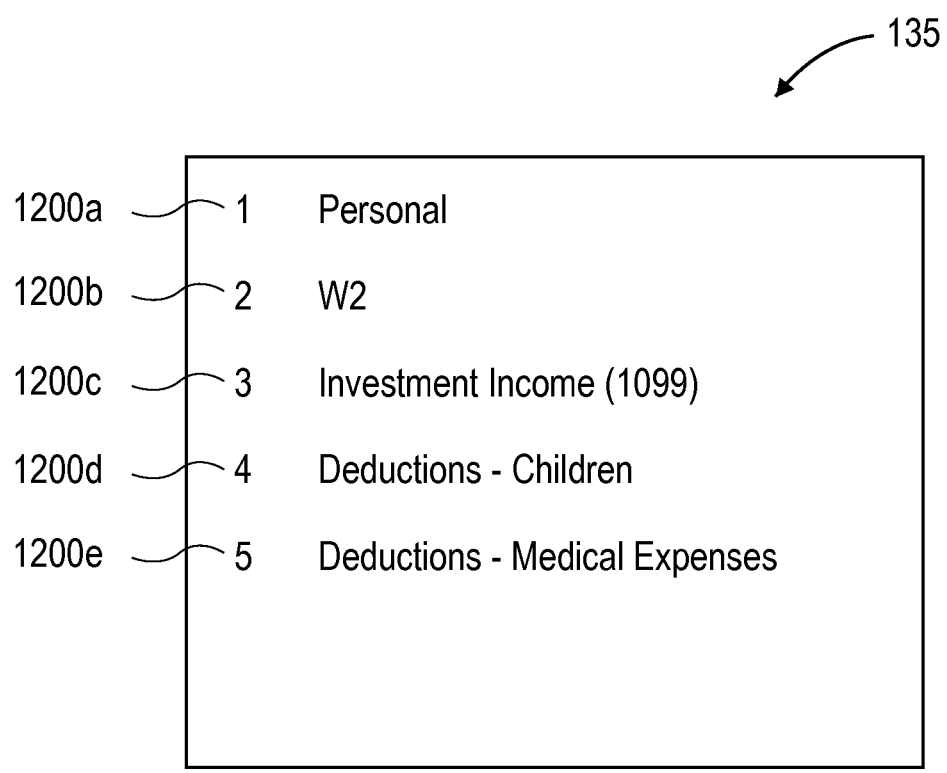
FIG. 12 illustrates an example of an initial template that is selected using embodiments illustrated in FIGS. 10-12.
Figure 13:
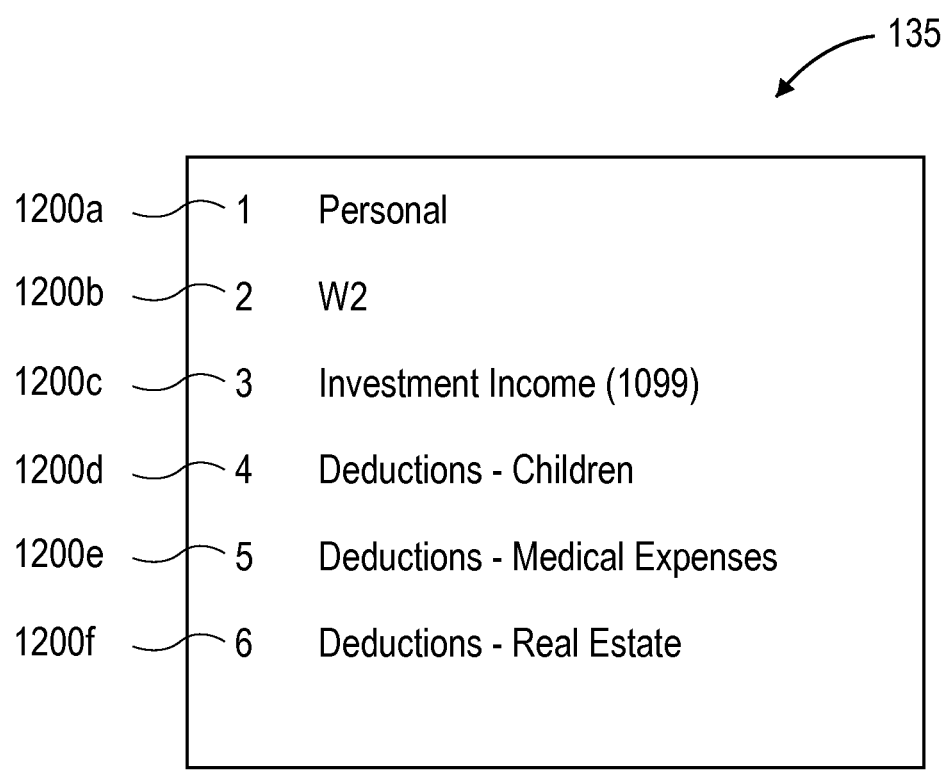
FIG. 13 illustrates an example of how the initial template shown in FIG. 12 can be modified or updated to form a second template according to embodiments.

For example, referring to FIG. 12, for a user 110 that is 37 years old, owns a house and has two children, the template 135 that is selected based on the third pre-defined profile 910c may include forms and screens for entering personal information 1200a (e.g., name, address, social security number, etc.), income (W2) information 1200b, investment income 1200c, deductions for the children 1200d and deductions for healthcare expenses 1200e for the family. In this manner, the pre-defined template 910c having forms or screens 1200a-e (generally 1200) that is selected is intended to include the forms or screens 1200 that the user 110 will likely require in order to complete the electronic tax return 124.

In the illustrated embodiment, however, the 37 year old user 110 owns a house, but the original template 135 illustrated in FIG. 12 did not include a form or screen 1200 for tax considerations related to owning a home (e.g., interest deduction, property tax, etc.) Thus, during use, the user 110 may add forms or screens 1200f related to tax considerations associated with owning a house.

According to embodiments, the first template 135 (FIG. 12) that includes forms or screens 1200a-e may then be updated or modified to dynamically generate a second, updated or modified template 135 (FIG. 13) that includes a form or screen 1200f related to house tax considerations. This updated or second template 135 may be used during preparation of the current electronic tax return 124. In another embodiment, the current electronic tax return 124 is completed using the current template 135 (FIG. 12), and when the same user 110 launches the tax preparation for the following year, the modified or second template 135 (FIG. 13) can be presented to the user 110 instead of the first template 135a that was not the best match.

Thus, embodiments that select an initial template 135 do so to provide a starting point or educated estimate regarding which forms or screens 1200 will likely be required, but then embodiments can adapt in an intelligent or smart way to changes made by the user 110 to modify the template 135 to be a better match to the user 110 during the current or next year. Although embodiments are described with reference to modifications concerning real estate, it should be understood that modifications for other reasons, and that modifications can be made based on how the user 110 interacts (e.g., behavioral attributes) with the first template 135a and/or or changes to the first template 135a (e.g., a different number of forms or screens, a different sequence of forms or screens or a different interaction with the forms or screens). Further, it should be understood that a modified template may have a different form or screen and a different number of forms or screens. A modified template 135 may also have a different sequence of forms or screens or a different interaction with the forms or screens, e.g., in response to behavioral data 520 or feedback regarding how the user interacts with a template 135.

Figure 14:
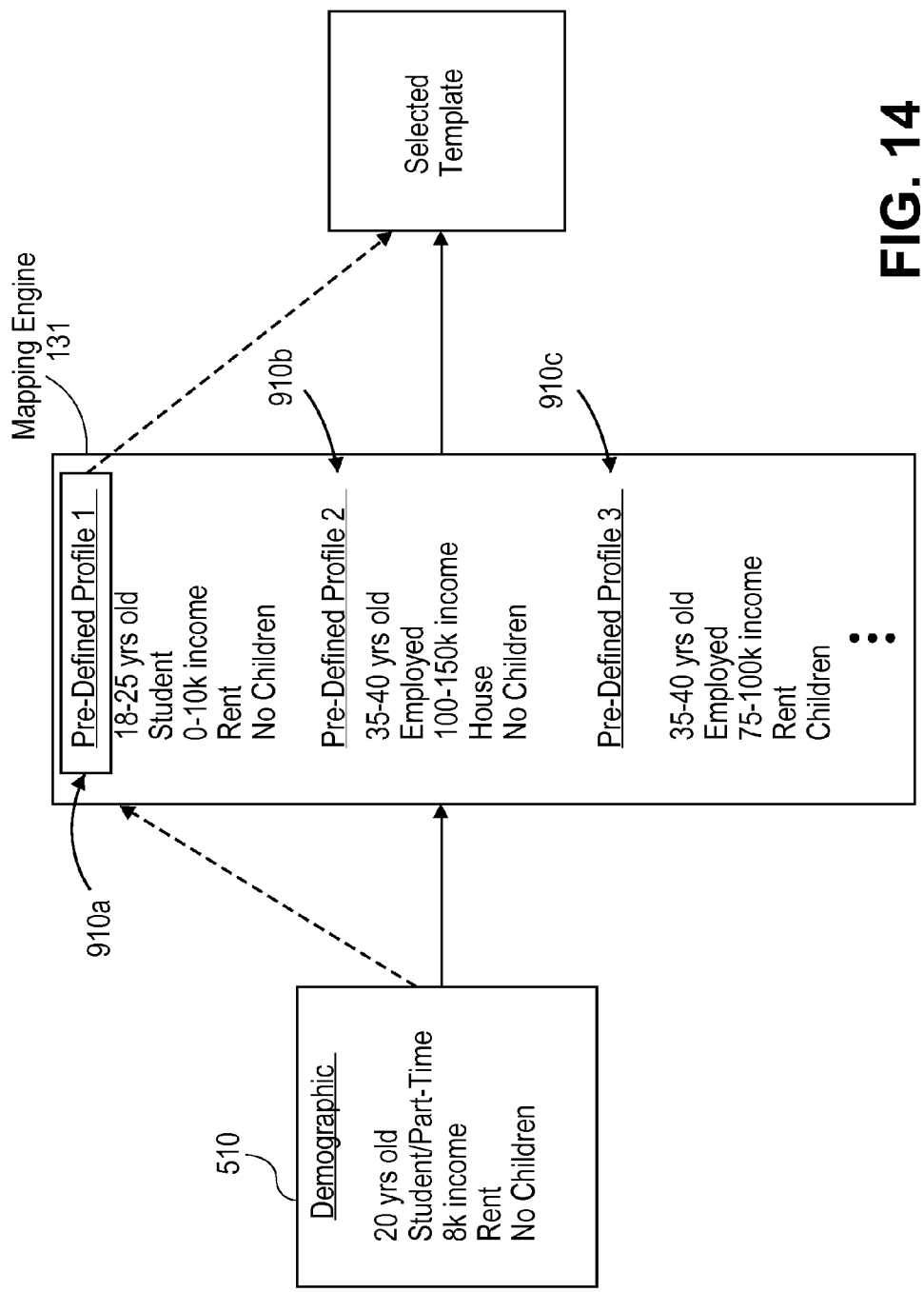
FIG. 14 illustrates another example of how embodiments utilizing pre-defined profiles may be implemented.
Figure 15:
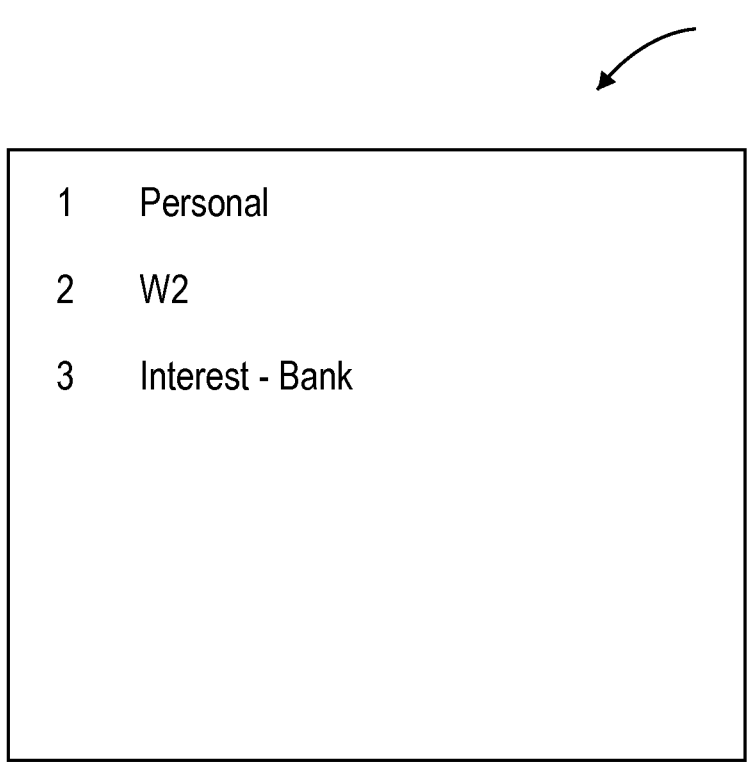
FIG. 15 illustrates an example of an initial template selected using embodiments illustrated in FIG. 14.

Referring to FIGS. 14-15, another example of how embodiments may be implemented involves a user 110 who is a 20 year old student who has a part-time job, makes $8,000 per year, rents an apartment and has no children. In this example, the template 135 that is selected is based at least in part upon the first pre-defined profile 910a (shown in FIG. 11), which may include forms and screens 1200 for entering demographic and income (W2) information and, in addition, forms for bank interest. In this manner, the template 910a that is selected is intended to include the forms or screens 1200 that the student user 110 will likely require in order to complete the electronic tax return 124.

In the illustrated embodiment, since the user 110 is a student, the user 110 may have deductible student loan interest or may have to report scholarship information as income. The original template 135a for the student user 110 did not include forms or pages for these matters. Thus, during use, the student user 110 may add forms or screens related to tax considerations associated with student loan interest and scholarships.

Figure 16:
FIG. 16 illustrates an example of how the initial template that was selected using embodiments illustrated in FIGS. 14-15 can be modified or updated according to embodiments.

Referring to FIG. 16, according to embodiments, the first template 135a that was selected based at least in part upon a pre-defined profile 910a may then be updated or modified by the student user 110 to include forms or screens 1200 related to student loan or scholarship considerations. This updated template 135b may be used during preparation of the current electronic tax return 124. In another embodiment, the current electronic tax return 124 is completed using the first template 135a, and when the same student user 110 launches the tax preparation program 122 the following year, the modified or second template 135b that includes forms or screens related to student loan interest and scholarship income can be presented to the student user 110 instead of the first template 135a. This updated or modified template 135b may also be sent to other student users 120a-n for their respective electronic tax returns 114a-n, e.g., through a social networking website such as Facebook.

Figure 17:
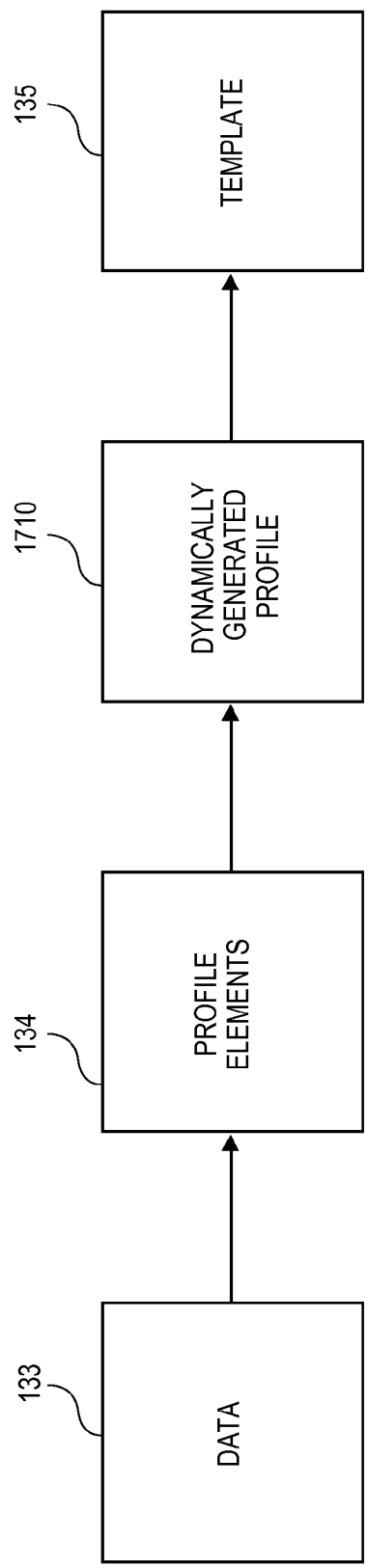
FIG. 17 is a flow chart illustrating one embodiment of a method of selecting a template based at least in part upon a dynamically generated profile.

Referring to FIG. 17, according to another embodiment, profiles are not fixed or static and instead are dynamically generated based on matches between data 133 related to a user 110 and profile elements or modules 134, which are grouped or complied into a profile 1710 that is dynamically generated. The dynamically generated profile 1710 is then mapped to a particular template 135.

Figure 18:
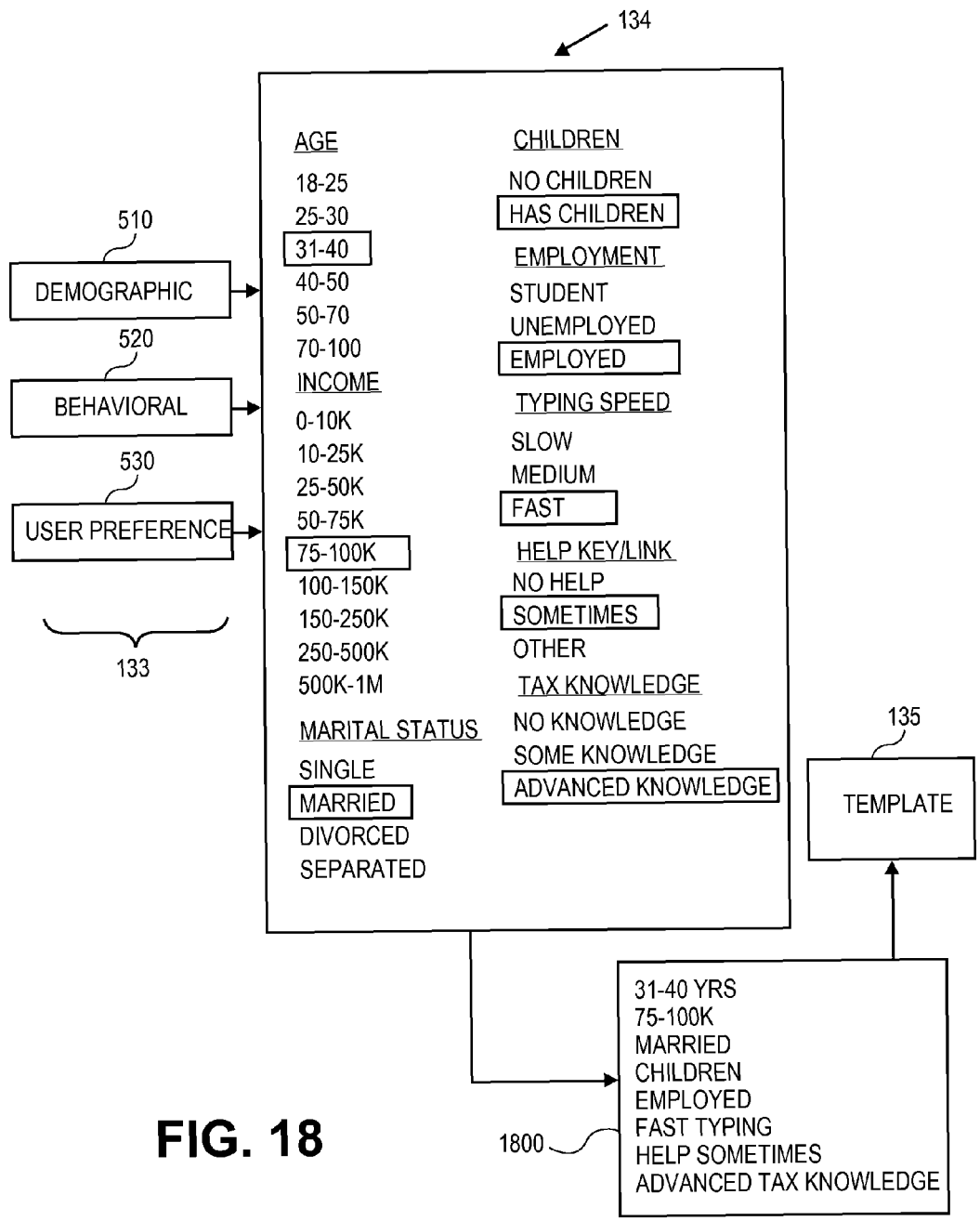
FIG. 18 illustrates an example of how a profile may be dynamically generated by determining which profile criteria or elements match data related to the user of the tax preparation program.

Referring to FIG. 18, in one embodiment, the mapping engine 131 accesses or receives profile elements 134 related to demographic 510, behavioral 520 and/or user preference 530 data. In the illustrated embodiment, profile criteria or elements 134 that relate to demographic data 510 may include age, income, marital status and employment, behavioral or feedback data 520 may include typing speed and use of help button, and user preference data 530 may include tax knowledge). In the illustrated embodiment, profile elements 134 include age 18-25 years, 26-30 years, 31-40 years, 41-50 years, 51-70 years and 71-100 years and various profile elements 134 for income, marital status, etc.

Continuing with the example involving a student user 110, the following profile criteria 134 are selected: age 18-25, income 0-10k, single, no children, employed, fast type, no help, some tax knowledge. These profile criteria 134 are compiled into a profile 1710, which is mapped to a corresponding template 135 which, as discussed above, may include forms or screens 1200 for demographic data, income (W2) and student loan interest deductions, and an initial template 135a can be modified based on changes made by the user 110 and/or behavior or feedback related to how the user 110 navigates or interacts with the initial template 135a.

It should be understood that embodiments may be implemented using static, pre-defined profiles 910, dynamically generated profiles 1710 and combinations thereof. Further, it should be understood that embodiments and processing described with reference to pre-defined profiles 910 may also apply to dynamically generated profiles 1710. Thus, these aspects of dynamically generated profiles 1710 are not repeated there.

Figure 19A:
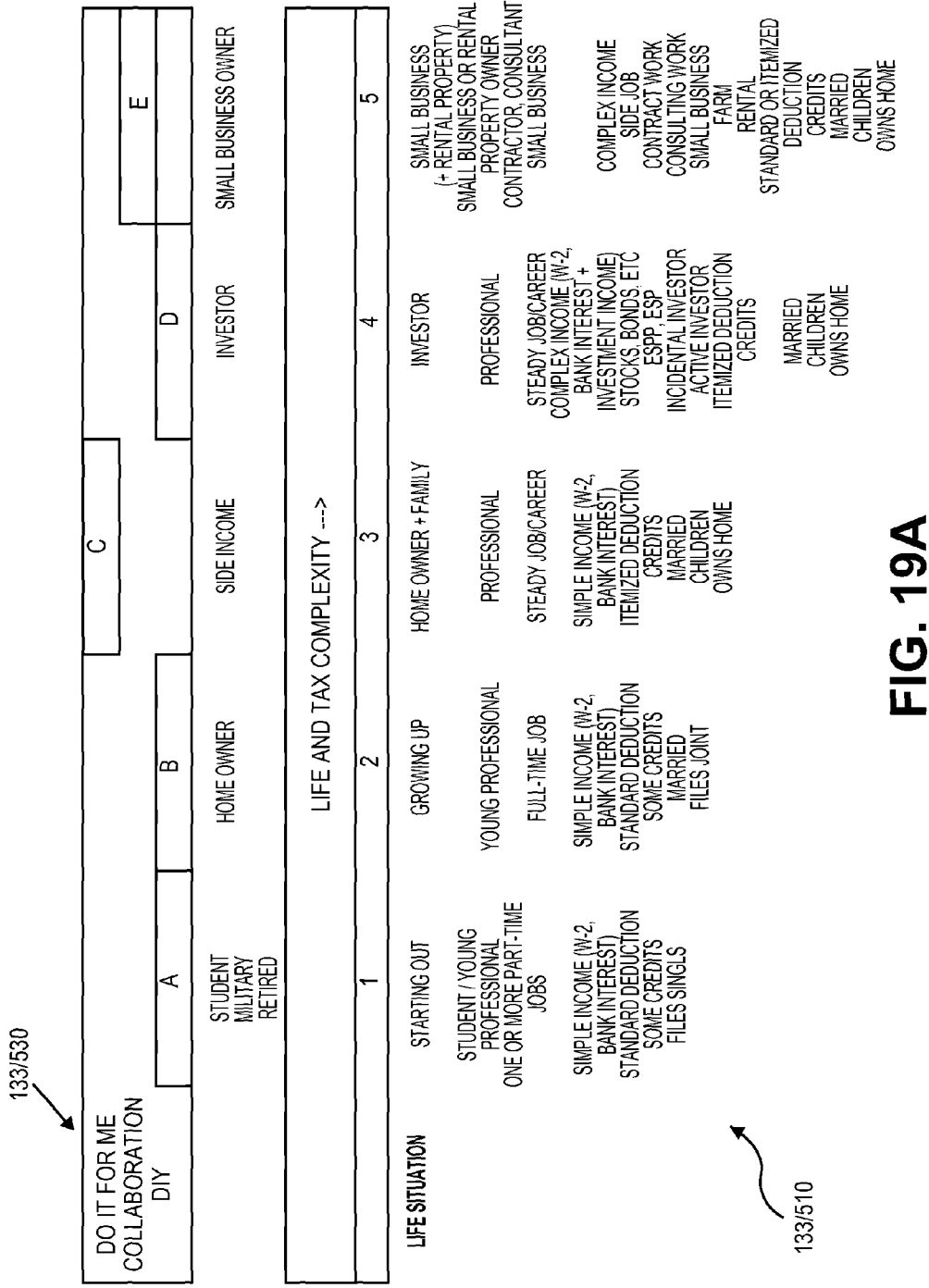
FIGS. 19A-B illustrate a more detailed example of how embodiments may be implemented and how different templates may be selected for different users of the tax preparation program to adapt the tax preparation program to the user.
Figure 19B:
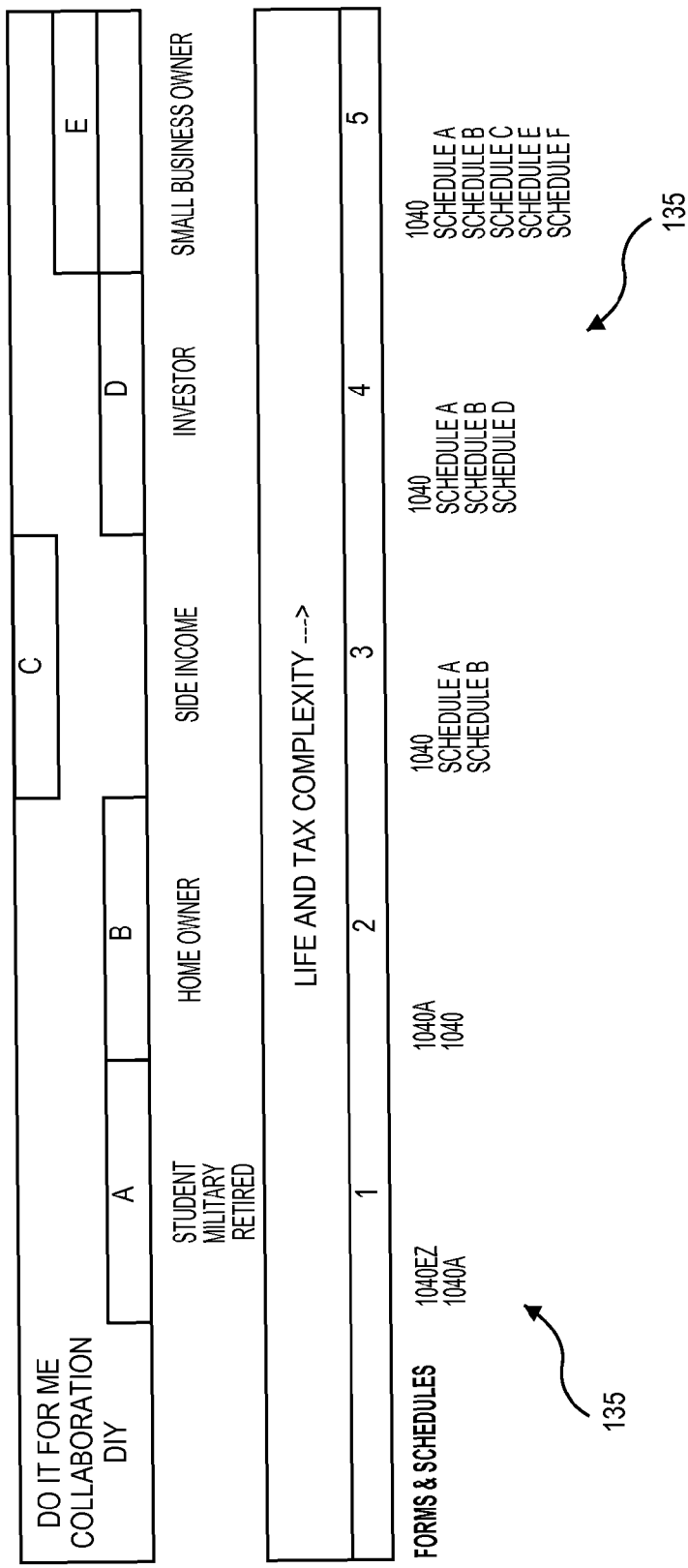

Referring to FIGS. 19A-B, a more detailed example of one manner in which embodiments may be implemented is illustrated. In the illustrated embodiment, user preference data 530 regarding the user's confidence level or desire for control over preparing of his or her electronic tax return is indicated as low confidence/control 1902, or "Do It For Me," medium confidence or control 1904, or "Collaboration" and high confidence or control 1906, or "Do It Yourself (DIY)." FIGS. 19A-B also illustrate different demographic data 510 in the form of different stages of a person's life and the associated complexities (columns 1-5). For example, students, military and retired persons may be considered to have less complicated tax issues and thus, the resulting profile based on this demographic data 510 is mapped to a template 135 having 1040A and 1040EZ forms, whereas investors and small business owners have more complicated and detailed templates 135.

In the illustrated example, the student, military person, retired person, home owner and investor are indicated to have high confidence and are "DIY" type users. Thus, the forms or screens of a template 135 presented to these users 120 may allow these users 120 to be exposed to or drill down into lower level details since this level of detail matches their "DIY" personality. In contrast, forms or screens are presented to the small business owner in a less detailed manner, and in the illustrated example, the person who has side income would prefer a "hands off" approach and have the tax preparation program 122 do most of the work. Thus, for these "do it for me" users 120, forms or screens 1200 presented to the user 110 can involve a lower level of interaction and input by the user 110 such that the tax preparation program 122 will require less input and interaction and perform more functions.

In the illustrated embodiment, the templates 135 for these five user categories reflect the tax complexities of each group. For example, the template 135 for younger users ("starting out"), students, military and retired users 120 includes 1040EZ and 1040A forms to reflect an initial assumption that such users 120 may have simple income, standard deductions, some tax credits and are single. A template 135 for young professionals ("growing up"), may include Forms 1040A and 1040 to reflect an initial assumption that such users 120 are employed, have simple income, have certain credits, are married and file jointly. A template 135 for older professionals ("home owner and family") may include Forms 1040, Schedule A and Schedule B to reflect an initial assumption that such users 120 have simple income, but itemize deductions (e.g., due to owning a house or having children), have certain credits and are married. A template 135 for investors may include Forms 1040, Schedule A, Schedule B and Schedule D to reflect an initial assumption that such users 120 have more complex income and investments (e.g., stocks, bonds, ESPP, ESP, etc.), itemize deductions, have certain credits, and are often married. A template for small business users may include Forms 1040, Schedule A, Schedule B, Schedule C, Schedule E and Schedule F.

As each user 110 (whether a student, military, retired, married, single, home owner, investor or small business owner, etc.) utilizes his or her template 135, the changes made to the template 135 (e.g., by adding or deleting a form) or feedback related to how the user 110 interacts with the template 135 (e.g., if the user 110 requests help often or goes "back" often) are received by the mapping engine 131 such that a modified or second template 135b can be generated for various users.

Figure 20:
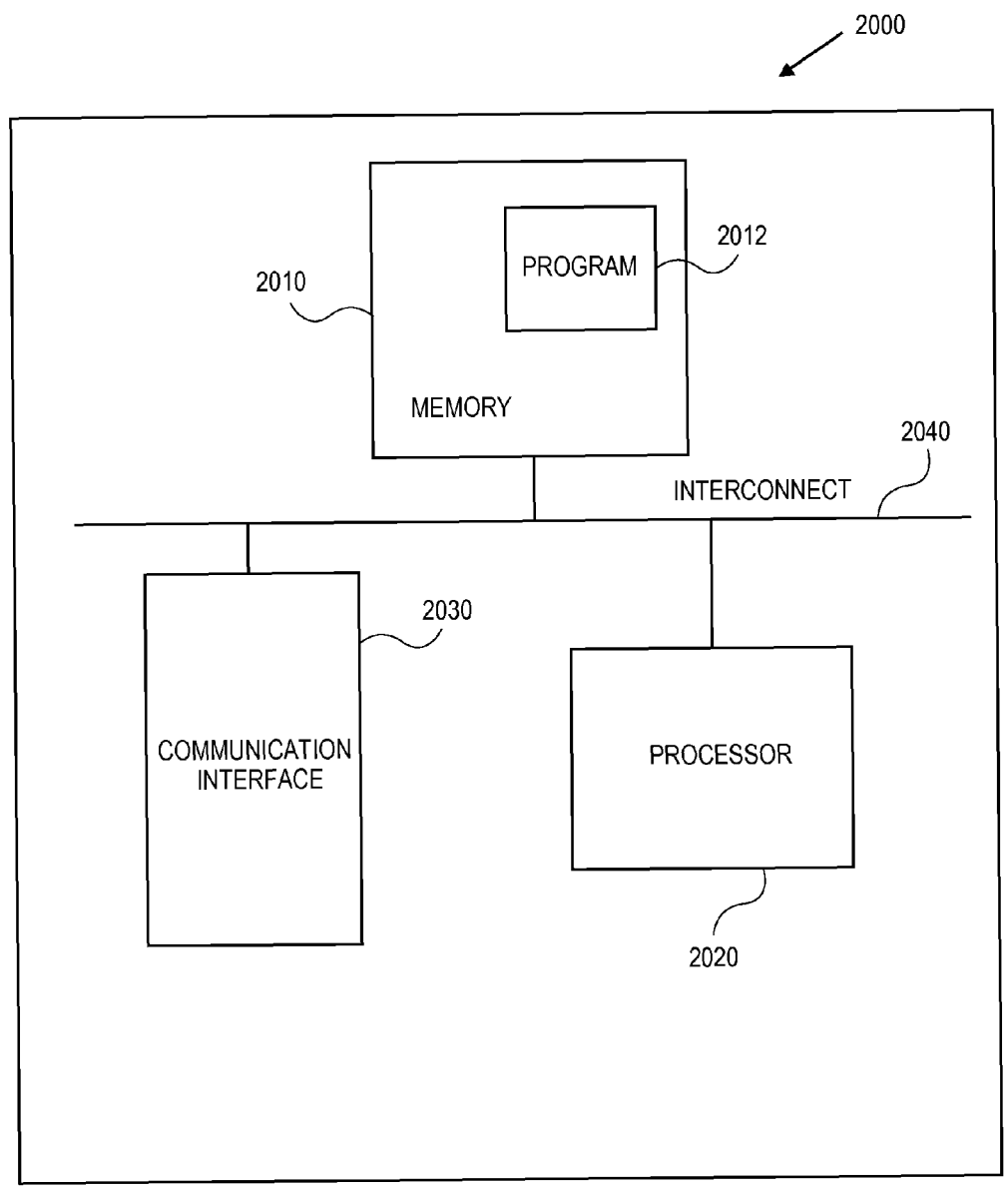
FIG. 20 is a system diagram of components of a computing apparatus that may be utilized by various system components.

FIG. 20 generally illustrates computing components that may be included in various system components to implement embodiments. A computing apparatus 2000 may include a memory 2010, program instructions 2012, a processor or controller 2020, a network or communications interface 2030, and connections or interconnect 2040 between such components. For example, the memory 2010 may be or include one or more of cache, RAM, ROM, SRAM, DRAM, RDRAM, EEPROM and other types of memory. The processor unit 2020 may be or include multiple processors, a single threaded processor, a multi-threaded processor, a multi-core processor, or other type of processor. Depending on the particular system component (e.g., whether the component is a computer or a hand held mobile communications device), the interconnect 2040 may include a system bus, LDT, PCI, ISA, or other types of buses, and the communications or network interface may, for example, be an Ethernet interface, a Frame Relay interface, or other interface. The network interface 2030 may be configured to enable a system component to communicate with other system components across a network 140 which, as explained above, may be a wireless or various other networks. Accordingly, the system configuration provided in FIG. 20 is provided for ease of explanation and illustration to generally illustrate system components that may be utilized in various embodiments.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magnetooptical storage medium. Examples of carriers include, but are not limited to, a floppy diskette, a memory stick or a flash drive, CD-R, CD-RW, CD-ROM, DVD-R, and DVD-RW. The processor 2020 performs steps or executes program instructions 2012 within memory 2010 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, although certain embodiments are described with reference to individual tax returns, embodiments can also be applied to preparation of business or corporate tax returns.

Further, although embodiments are described with reference to an electronic tax program, embodiment may also be part of or implemented using other types of finance programs including personal finance programs such as Quicken® and FinanceWorks®, which are also available from Intuit Inc., Microsoft Money, which is available from Microsoft Corporation, Redmond, Wash. and other personal finance programs including mint.com and wasabe.com. Quicken® and FinanceWorks® are registered trademarks of Intuit Inc.

Moreover, embodiments may involve selection of a template based at least in part upon only demographic data, only behavioral data, only user preference data, both demographic and behavioral data, both demographic and user preference data, both behavioral and user preference data, and all three types of data. Accordingly, it should be understood that embodiments that are described with reference to particular examples involving demographic data may be applied and expanded to utilize various combinations of data types as discussed above.

Additionally, changes or modifications to a template to form a modified or second template that is provided to a current user and/or to other users of the finance program may be modified by input from or changes made by a user and/or behavioral feedback from the current user. For example, if it is determined that the user requests help often or goes back to prior screens often, the mapping engine may determine that this particular user requires a simplified interface and interaction model such that minimal work is required by the user, and most of the work is done by the tax preparation application. Thus, it should be understood that intelligent modifications to templates can be based on various types of data and feedback, and that a modified template may be the result of input by a current user and/or other users of the finance program.

Also, where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially.

Accordingly, embodiments are intended to exemplify alternatives, modifications, and equivalents that may fall within the scope of the claims.

What is claimed is:

1. A computer-implemented method of adapting a tax return preparation program for preparing an electronic tax return to a user of the tax preparation program, the method comprising:
   an intermediate computer, in communication with a user computer through a network, receiving data related to a first user of the tax return preparation program utilized by the first user to prepare a first electronic tax return for a first year and storing received data to a data store;
   a mapping engine accessing or receiving the received data stored in the data store and comparing the received data and profile criteria;
   the mapping engine selecting a profile based at least in part upon comparing the data and the profile criteria;
   the mapping engine selecting a first template of a plurality of templates of the tax return preparation program, the selected first template corresponding to the selected profile and comprising a first collection of forms or screens of the tax return preparation program selected from available forms or screens of the tax return preparation program;
   the tax preparation program presenting forms or screens of the first template to the user;
   the mapping engine determining how the first user of the tax preparation application interacts with or changes the first template during preparation of the first electronic tax return and modifying the first template to generate a second template in response to the first user interacting with or changing the first template, the second template being different than the first template.

2. The method of claim 1, the received data comprising data of other users of the tax return preparation program, wherein the other user is not the first user.

3. The method of claim 1, the received data comprising data of a prior electronic tax return of the first user.

4. The method of claim 1, the received data comprising data provided by a tax authority or tax collecting entity.

5. The method of claim 1, the received data comprising data entered by the first user in response to a questionnaire presented to the first user by the tax return preparation program.

6. The method of claim 1, the profile criteria comprising demographic criteria.

7. The method of claim 6, the demographic criteria being selected from at least one of the group consisting age, income, education, marital status and number of children.

8. The method of claim 1, the received data comprising user preference data provided by the first user.

9. The method of claim 1, the received data comprising behavioral data related to how the first user interacted with the tax return preparation program during prior use of the tax return preparation program by the first user.

10. The method of claim 9, the behavioral data during prior use of the tax return preparation program being selected from at least one of the group consisting of how the first user previously navigated forms or screens of the tax return preparation program, previously utilized a pre-determined key, previously utilized a pre-determined button or link displayed by the tax return preparation program, an amount of time the first user previously spent on a form or screen generated by the tax return preparation program, and a prior typing speed of the first user.

11. The method of claim 1, the received data being used by the mapping engine to select the profile but not being included in the first electronic tax return.

12. The method of claim 1, the received data used by the mapping engine to select the profile being included in the first electronic tax return.

13. The method of claim 1, the profile criteria comprising a plurality of pre-defined profiles, each pre-defined profile comprising pre-defined criteria, wherein the mapping engine compares the received data with respective pre-defined criteria of respective pre-defined profiles.

14. The method of claim 13, the selected pre-defined profile including pre-defined criteria that substantially corresponds to the received data.

15. The method of claim 13, each pre-defined profile comprising pre-defined demographic criteria.

16. The method of claim 15, the pre-defined demographic criteria being selected from at least one of the group consisting of a pre-defined range of ages, a pre-defined range of income, and a pre-defined marital status.

17. The method of claim 13, each pre-defined profile further comprising: pre-defined behavioral criteria data related to how the first user navigates or interacts with forms or screens generated by the tax return preparation program, and user preference data.

18. The method of claim 1, the profile criteria comprising a plurality of profile elements, the method further comprising the mapping engine:
   comparing the received data and the plurality of profile elements;
   selecting profile elements that substantially correspond to or match the received data; and
   dynamically generating a profile that includes the selected profile elements, the first template being selected based at least in part upon the dynamically generated profile.

19. The method of claim 18, the plurality of profile elements comprising:
   a first profile element for a first range of ages, and
   a second profile element for a second range of ages different than the first range,
   wherein the mapping engine compares the received data of an age of the first user to the first profile element and the second profile element, and one of the first and second profile elements is selected by the mapping engine for inclusion in the dynamically generated profile.

20. The method of claim 18, the dynamically generated profile comprising demographic profile elements related to and selected from at least one of the group consisting of a pre-defined range of a range of ages, a range of income, and a marital status.

21. The method of claim 18, the dynamically generated profile comprising:
behavioral profile elements related to how the first user navigates or interacts with forms or screens generated by the tax return preparation program, and
user preference profile elements.

22. The method of claim 21, the behavioral profile elements being related to and selected from at least one of the group consisting of how the first user utilizes a pre-determined key on a keyboard, a pre-determined button or link displayed by the tax return preparation program, how long the first user spends on a form or screen generated by the tax return preparation program, and a typing speed of the first user.

23. The method of claim 1, the second template including a different form or screen of the tax return preparation program compared to the first template.

24. The method of claim 1, further comprising the tax preparation program displaying forms or screens of the second template to the first user during preparation of the first electronic tax return utilizing the tax return preparation program for the first year.

25. The method of claim 1, the method further comprising the tax preparation program displaying forms or screens of the second template to the first user during preparation of a second electronic tax return utilizing the tax return preparation program for a second year.

26. The method of claim 1, further comprising the tax preparation program displaying forms or screens of the second template to a second user of the tax return preparation program, wherein the second user is not the first user.

27. The method of claim 1, further comprising the intermediate computer transmitting at least one of the first template and the second template to a second computer that can be accessed by other users of the tax return preparation program to prepare respective other electronic tax returns utilizing the at least one of the first template and the second template.

28. The method of claim 27, the second computer being part of an on-line social network such that members of the on-line social network can download at least one of the first template and the second template for preparation of their respective electronic tax returns.

29. The method of claim 1, further comprising the tax preparation program displaying forms or screens of the first template to the first user to allow the first user to prepare a first electronic tax return using the first template.

30. The method of claim 8, the user preference data being selected from at least one of the group consisting of the first user's tax knowledge, prior experience with the tax return preparation program, and desired level of control while completing the first electronic tax return utilizing the tax return preparation program.

31. The method of claim 17, the user preference data being selected from at least one of the group consisting of the first user's tax knowledge, prior experience with the tax return preparation program, and desired level of control while completing the first electronic tax return utilizing the tax return preparation program.

32. The method of claim 21, the user profile elements being related to and selected from at least one of the group consisting of the first user's tax knowledge, prior experience with the tax return preparation program, and a desired level of control while completing the first electronic tax return utilizing the tax return preparation program.

33. The method of claim 1, the second template comprising a second collection of forms or screens of the tax return preparation program selected from available forms or screens of the tax return preparation program.

34. The method of claim 1, wherein the second template includes a different number of forms or screens of the tax return preparation program compared to the first template.

35. The method of claim 1, wherein the second template includes a different sequence of forms or screens of the tax return preparation program compared to the first template.

36. The method of claim 1, wherein the second template includes a different interaction with the forms or screens of the tax return preparation program compared to the first template.

37. A computer-implemented method of adapting a tax preparation program to a user of the tax return preparation program, the method comprising:
an intermediate computer, in communication with a user computer through a network, receiving data related to a first user of the tax return preparation program utilized by the first user to prepare a first electronic tax return for a first year and storing received data to a data store;
a mapping engine reading or accessing the received data stored in the data store and comparing the received data and profile criteria, the profile criteria comprising a plurality of pre-defined profiles, each pre-defined profile comprising pre-defined criteria, wherein the received data is compared with respective pre-defined criteria of respective pre-defined profiles;
the mapping engine selecting a profile based at least in part upon comparing the received data and the profile criteria;
the mapping engine selecting a first template of a plurality of templates, the selected first template corresponding to the selected profile and comprising a first collection of forms or screens of the tax return preparation program selected from available forms or screens of the tax preparation program;
the tax preparation program presenting forms or screens of the first template to the user;
the mapping engine determining how the first user of the tax preparation application interacts with or changes the first template during preparation of the first electronic tax return and modifying the first template to generate a second template in response to the first user interacting with or changing the first template the first template; and
the tax preparation presenting forms or screens of the second template to a second user of the tax preparation application during preparation of a second electronic tax return, wherein the second user is not the first user.

* * * * *